US007227973B2

(12) United States Patent
Ishiyama

(10) Patent No.: US 7,227,973 B2
(45) Date of Patent: Jun. 5, 2007

(54) DEVICE, METHOD AND RECORD MEDIUM FOR IMAGE COMPARISON

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 863 days.

(21) Appl. No.: 09/823,763

(22) Filed: Apr. 3, 2001

(65) Prior Publication Data
US 2001/0033685 A1 Oct. 25, 2001

(30) Foreign Application Priority Data
Apr. 3, 2000 (JP) .............................. 2000-105399

(51) Int. Cl.
*G06K 9/00* (2006.01)
(52) U.S. Cl. ...................... 382/103; 382/154; 382/209
(58) Field of Classification Search ................ 382/103, 382/115–118, 285–286, 209, 217; 345/418, 345/426
See application file for complete search history.

(56) References Cited
U.S. PATENT DOCUMENTS

| 6,002,782 | A | * | 12/1999 | Dionysian | ................... | 382/118 |
| 6,496,594 | B1 | * | 12/2002 | Prokoski | ...................... | 382/118 |
| 6,545,673 | B1 | | 4/2003 | Shiitani et al. | ............. | 345/418 |
| 6,956,569 | B1 | * | 10/2005 | Roy et al. | ................... | 345/426 |

FOREIGN PATENT DOCUMENTS

| EP | 1139269 A2 | * | 10/2001 |
| JP | H4-130587 A | | 5/1992 |
| JP | H4-256185 A | | 9/1992 |
| JP | H5-73663 A | | 3/1993 |
| JP | H6-109441 A | | 4/1994 |

(Continued)

OTHER PUBLICATIONS

H. Murase et al., "Visual Learning and Recognition of 3-D Objects from Appearance", International Journal of Computer Vision, vol. 14, (1995), pp. 5-24 with Abstract.

(Continued)

*Primary Examiner*—Jingge Wu
*Assistant Examiner*—Tom Y. Lu
(74) *Attorney, Agent, or Firm*—Sughrue Mion, PLLC

(57) ABSTRACT

An image comparison device for comparing a target object (an object to be recognized or identified) with registered objects (objects which are preliminarily registered to be compared with the target object) includes a registration section and a comparison section. The registration section measures the 3-D shape and surface reflectance of each registered object and registers and stores them as registered data. In the comparison section, a photographing section photographs a target object and thereby obtains an input image. A position/pose estimation section estimates the position/pose of the target object in the input image and thereby obtains position/pose parameters. An illumination correction section generates a reference image of each registered object (a 2-D image of the registered object in the same position/pose as the target object in the input image and under the same illumination condition as in the input image) by use of the position/pose parameters obtained by the position/pose estimation section and the registered data. An image comparison section calculates an evaluation value concerning the similarity between the reference image and the input image. A judgment section judges whether or not each of the registered objects is the same as or similar to the target object based on the evaluation value.

97 Claims, 15 Drawing Sheets

FOREIGN PATENT DOCUMENTS

| JP | 6-168317 | 6/1994 |
| JP | H06-168317 | 6/1994 |
| JP | H8-96137 A | 4/1996 |
| JP | H8-233556 A | 9/1996 |
| JP | 9-259271 | 10/1997 |
| JP | H09-259271 A | 10/1997 |
| JP | H10-162137 A | 6/1998 |
| JP | H10-302064 A | 11/1998 |
| JP | 2872776 | 1/1999 |
| JP | H11-53547 A | 2/1999 |
| JP | 11-123687 | 4/2000 |
| JP | 2000-306095 A | 11/2000 |
| JP | 2001-283222 A | 10/2001 |

OTHER PUBLICATIONS

P.N. Belhumeur et al., "What Is the Set of Images of an Object Under All Possible Illumination Conditions?", International Journal of Computer Vision, vol. 28, Issue No. 3, (1998), pp. 245-260 with Abstract.

A.S. Georghiades et al., "Illumination Cones for Recognition Under Variable Lighting: Faces*", Proc. IEEE International Conference CVPR, (1998), pp. 52-58 with Abstract.

M. Woo et al., "Open GL programming Guide", Addison-Wesley Publishers Japan, pp. 1-151.

S. Adamatsu, "Computer Recognition of Human Face-A Survey-", The Transactions of the Institute of Electronics, Information and Communication Engineers, vol. 80, No. 8, (1997), pp. 1215-1230.

S. Ying Ho et al., "An analytic solution for the pose determination of human faces from a monocular image", Pattern Recognition Letters, vol. 19, (1998), pp. 10450-10454 with Abstract.

R.Y. Tsai, "An Efficient and Accurate Camera Calibration Technique for 3D Machine Vision", Proc. CVPR '86, pp. 364-374 with Abstract.

Paul J. Besl, et al., "Three-Dimensional Object Recognition" ACM Computing Surveys, New York, NY, vol. 17, No. 1, Mar. 1985, pp. 75-145.

Athinodoros S. Georghiades, et al., "Illumination Cones for Recognition under Variable Lighting: Faces" Computer Vision and Pattern Recognition, 1998, Proceedings, 1998 IEEE Computer Society Conference on Santa Barbara, CA, Jun. 23-25, 1998, Los Alamitos, CA, IEEE Computer Society, Jun. 23, 1998, pp. 52-58.

Shinn-Ying Ho, et al. "An Analytic Solution for the Pose Determination of Human Faces from a Monocular Image", Pattern Recognition Letters, North-Holland Publications, Amsterdam, Netherlands, vol. 19, No. 11, Sep. 1, 1998, pp. 1045-1054.

Hiroshi Murase, et al., "Visual Learning and Recognition of 3-D Objects From Appearance" International Journal of Computer Vision, Kluwer Academic Publishers, Norwell, US, vol. 14, No. 1, 1995, pp. 5-24.

Watabe M. et al., "Technique of synchronized input of object surface shape and color information", NTT R & D, The Telecommunications Association, Apr. 10, 1993, pp. 465-476, col. 42, No. 4.

* cited by examiner

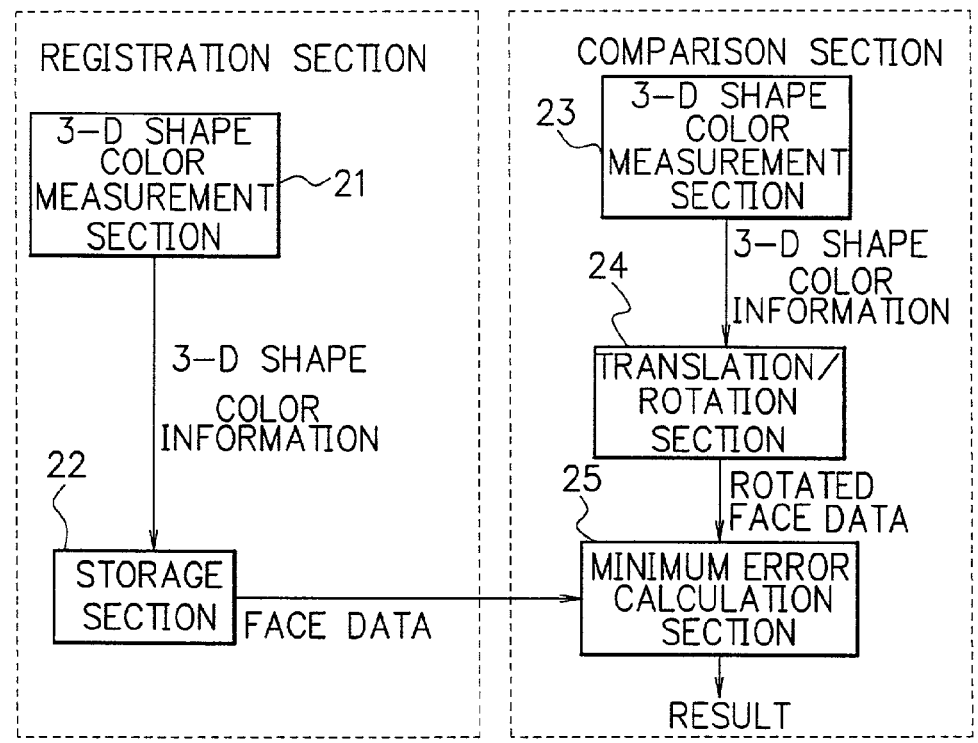
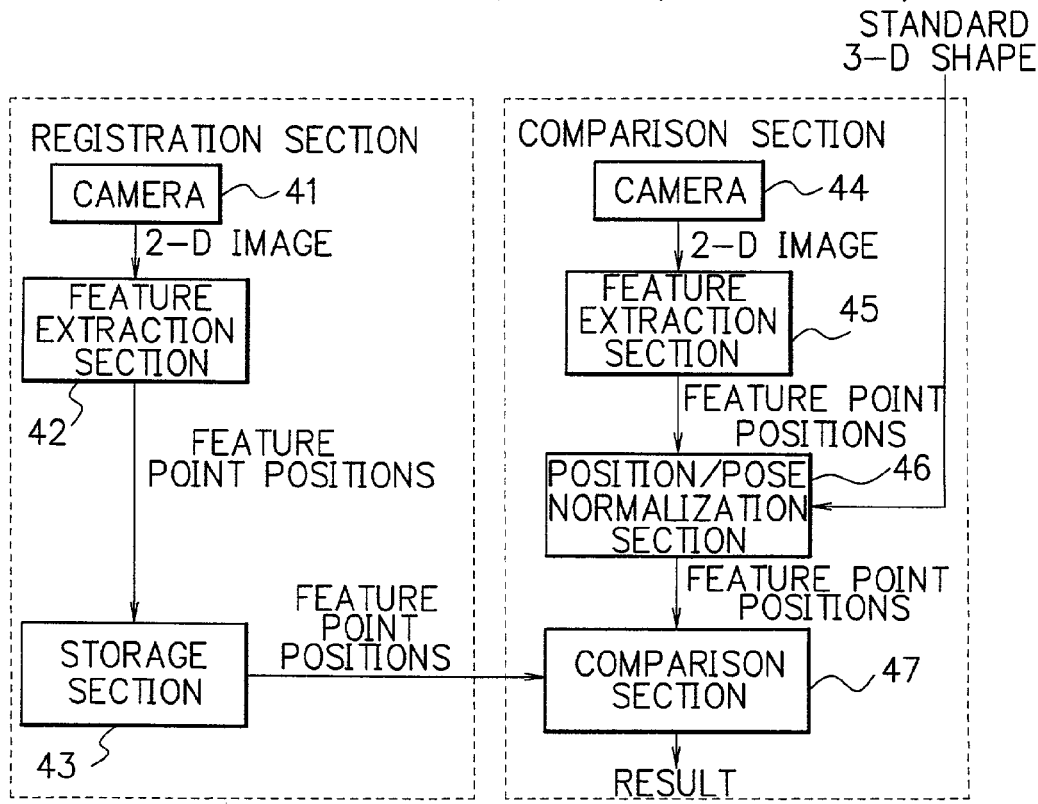

F I G. 10
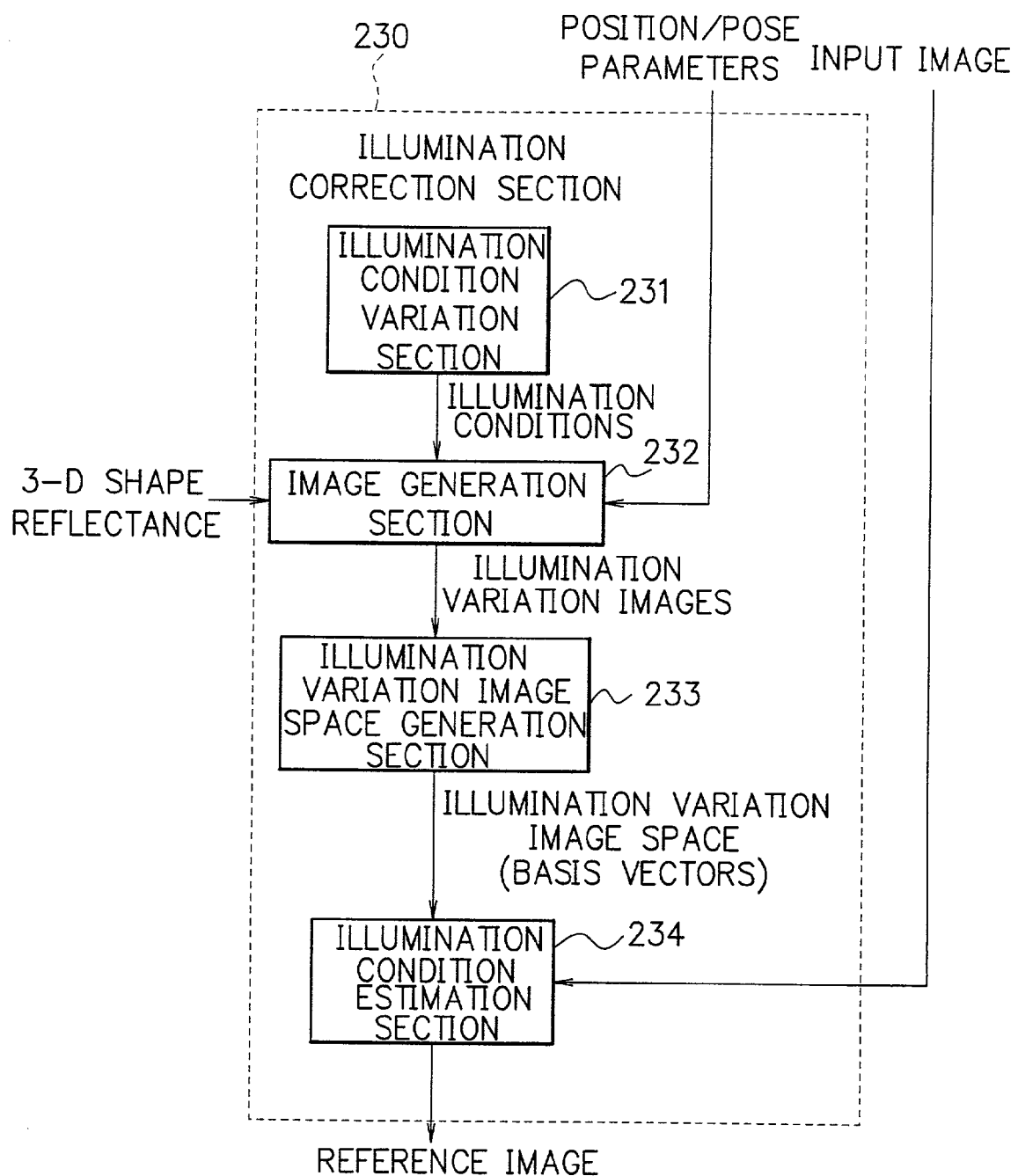

F I G. 11
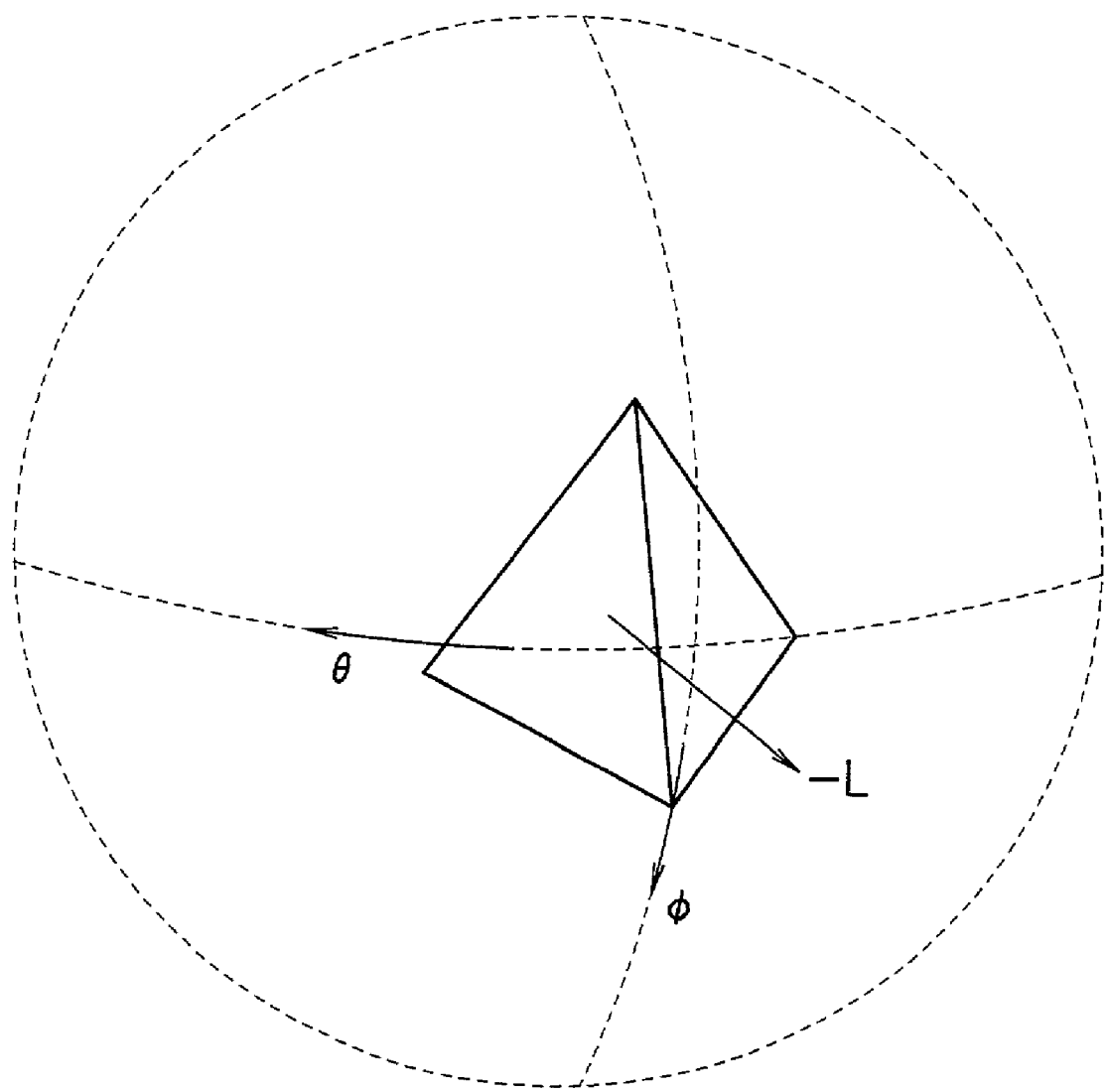

DEVICE, METHOD AND RECORD MEDIUM FOR IMAGE COMPARISON

BACKGROUND OF THE INVENTION

The present invention relates to an image comparison device and an image comparison method for comparing a target object with registered objects by use of images, and in particular, to an image comparison device and an image comparison method capable of conducting the comparison correctly withstanding variations of shooting (photographing) conditions (position/pose of the target object in the image, illumination conditions, etc.) by preliminarily registering and storing 3-D (three-dimensional) shape information, surface reflectance information, color information etc. of the registered objects.

DESCRIPTION OF THE RELATED ART

FIG. 1 is a schematic diagram explaining the concept of image comparison. In generally used image comparison techniques, an object (target object: an object to be identified) existing in the three-dimensional space in a random position/pose is photographed by use of a photographing device (camera, video camera, etc.) and thereby one or more input images are obtained. Thereafter, the input images of the target object are compared with images of objects (registered objects) which have preliminarily been registered. The image comparison process is generally composed of two steps: a registration step for registering and storing images, data, etc. of the registered objects; and a comparison step for comparing the input image of the target object with the registered images, data, etc. of the registered objects and thereby judging what the target object is. In each step, the photographed image is used as a 2-D (two-dimensional) image without being processed, or is used after being converted to a 3-D (three-dimensional) shape. In the following, conventional image comparison techniques will be explained in detail referring to documents.

Incidentally, the terms "target object" and "registered object" will hereafter be used in the above meanings. The term "registered object" denotes not only "an object that has been registered for comparison" but also "an object that will be registered for comparison".

A "face image comparison device" disclosed in Japanese Patent No. 2872776 (hereafter, referred to as "document No. 1") uses 2-D registered images and 2-D input images. FIG. 2 is a schematic block diagram explaining the composition and operation of the face image comparison device of the document No.1, which has been designed to conduct image comparison of human faces. In the registration step, a plurality of 2-D face images of registered objects are obtained by use of a camera 11, and the obtained 2-D face images of the registered objects are stored in a storage section 12. In the comparison step, a 2-D face image of a target object is obtained as the input image by use of a camera 13. A normalization section 14 extracts feature points (eyes, nose, etc. to be used as the criteria for judging pose, size, etc.) from the input image by means of image processing, and normalizes the 2-D face image (input image) by use of the feature points. For example, the normalization is done by means of translation, scaling and rotation in the 2-D image so that the eyes will be on the level and the distance between the eyes will be a predetermined distance. Thereafter, an image comparison section 15 reads out the registered images of the registered objects from the storage section 12, compares the normalized input image with the registered images by means of pattern recognition, and outputs the result of the comparison.

A "personal identification device" disclosed in Japanese Patent Application Laid-Open No. HEI9-259271 (hereafter, referred to as "document No. 2") employs 3-D shapes for the comparison. FIG. 3 is a schematic block diagram explaining the composition and operation of the personal identification device of the document No. 2. In the registration step, a 3-D shape color measurement section 21 measures 3-D shape and color of each registered object, and the 3-D shape information and the color information of each registered object are stored in a storage section 22 as registered data. In the comparison step, a 3-D shape color measurement section 23 measures 3-D shape and color of a target object, and thereby obtains 3-D shape information and color information of the target object as input data. A translation/rotation section 24 translates the input data (3-D shape) so that the barycenter of the input data (3-D shape) will be on the barycenter of the registered data (3-D shape). Subsequently, the translation/rotation section 24 rotates the translated input data in various ways, and a minimum error calculation section 25 obtains the error between the rotated input data and the registered data. The minimum error calculation section 25 adjusts the 3-D position and pose of the input data (3-D shape) by finding a rotated input data that gives the minimum error. Thereafter, the minimum error calculation section 25 compares the input data (whose position/pose has been corrected and adjusted) with the registered data.

A "personal identification device" disclosed in Japanese Patent Application Laid-Open No. HEI6-168317 (hereafter, referred to as "document No. 3") uses 2-D images both in the registration step and the comparison step. FIG. 4 is a schematic block diagram explaining the composition and operation of the personal identification device of the document No. 3. In the registration step, 2-D images of each registered object are obtained by use of a camera 41. A feature extraction section 42 extracts feature points (where variations in pixel intensity are large) from each 2-D image and stores position data of the feature points in a storage section 43. In the comparison step, a 2-D image of a target object is obtained as an input image by use of a camera 44. Subsequently, a feature extraction section 45 extracts feature points (where variations in pixel intensity are large) from the 2-D input image and outputs position data of the feature points. Subsequently, in order to compensate for and absorb variations in position/pose of the target object, the feature point position data outputted by the feature extraction section 45 (expressing the position/pose of the target object) are normalized by a position/pose normalization section 46 by use of a 3-D shape model of a standard object which has been prepared in the position/pose normalization section 46, and the normalized feature point position data are supplied to a comparison section 47. The comparison section 47 conducts the personal identification by comparing the normalized feature point position data concerning the target object with the feature point position data which have been registered and stored in the storage section 43.

A technique disclosed in a document: Hiroshi Murase and Shree K. Nayer "Visual Learning and Recognition of 3-D objects from Appearance", Int. J. Computer Vision, vol. 14, pp. 5–24 (1995) (hereafter, referred to as "document No. 4") uses 2-D images both in the registration step and the comparison step and executes correction not only for variations in position/pose but also for variations due to illumination conditions. FIG. 5 is a schematic block diagram explaining the technique of the document No. 4. In the registration step, a large set of 2-D sample images of each registered object are obtained by a photographing section 71 by automatically varying pose of the object and illumination conditions so that all feasible poses and illumination conditions can be covered. A manifold calculation section 72 obtains basis images capable of expressing the variations of the sample images, by means of principal component analysis (PCA). Subsequently, the manifold calculation section 72 generates a feature space which is spanned by the basis images, obtains a trajectory of the sample images in the feature space as a manifold, and stores the obtained manifold in a storage section 73. In the comparison step, a 2-D image of a target object is obtained by a camera 74 as an input image. A distance calculation section 75 calculates the distance between the input image and the manifold in the feature space and executes the comparison using the distance as a yardstick, thereby the comparison by use of the input image, which can be obtained under various illumination conditions and poses, is made possible.

Changes occurring to a 2-D image due to variations of illumination conditions when the position/pose of the object is fixed has been analyzed in detail in a document: Peter N. Belhumeur and David J. Kriegman "What is the Set of Images of an Object Under All Possible Illumination Conditions ?", Int. J. Computer Vision, vol. 28, pp. 245–260 (1998) (hereafter, referred to as "document No. 5"). In the case where the position and pose of the object are fixed, an image obtained under an arbitrary illumination condition can be resolved into images each of which is obtained under a point source of light. Therefore, an image obtained under an arbitrary number of point sources of light can be expressed as a linear combination of images each of which is obtained under a point source of light, in which the intensity of each point source is used as each coefficient of the linear combination. Based on the above analysis, a method called "illumination subspace method" which is shown in FIG. 6 has been proposed.

Referring to FIG. 6, in the registration step, a photographing section 51 selects and sets three or more illumination conditions so that the number of pixels in shadow will be as small as possible, and obtains images of each registered object under the three or more illumination conditions. A normal line calculation section 52 obtains reflectance vectors [(reflectance)×(normal vector)] on the surface of the registered object, with regard to each pixel in the images, by means of principal component analysis (PCA). An image generation section 53 successively generates images which are called "extreme rays" and stores the generated extreme rays in a storage section 54. The extreme ray is an image of the registered object when a point source of light (at an infinite-point) exists in a direction that is expressed by the exterior product of arbitrary two of the reflectance vectors.

In the comparison step, a 2-D image of a target object is obtained by use of a camera 55 as an input image. When the reflectance property of the surface of an object is perfect scattering (Lambertian model) and the surface is convex, an image of the object under an arbitrary illumination condition can be expressed by a linear combination of the extreme rays with positive coefficients, therefore, an illumination correction section 56 generates a reference image (an image of the registered object under the same illumination condition as in the input image) by use of a linear combination of the extreme rays. The coefficients of the linear combination (reference image) are determined by use of the nonnegative least-squares method. An image comparison section 57 compares the input image with the reference image by calculating the similarity between the two images.

In a technique disclosed in a document: A. S. Georghiades et al. "Illumination Cones for Recognition Under Variable Lighting: Faces", Proc. IEEE Int. Conf. CVPR, pp. 52–58 (1998) (hereafter, referred to as "document No. 6"), when the extreme rays are obtained according to the "illumination subspace method", pixels that should be in shadow are found out based on the 3-D shape of the object by use of techniques of computer graphics such as ray tracing, and the pixels are shadowed. The technique of the document No. 6 aims to apply the "illumination subspace method" to objects having concavities.

The aforementioned document No. 5 also proposes a "sampling method" which is shown in FIG. 7. It takes much time to calculate all the extreme rays as in the "illumination subspace method", therefore, in the sampling method of FIG. 7, a photographing section 61 in the registration step selects and sets an appropriate number of illumination conditions (illumination directions) so that the angles ($\Theta$, $\phi$) shown in FIG. 11 will cover the sphere at almost even intervals for example, and obtains images under the illumination conditions. The images obtained as above is substituted for the extreme rays. In the comparison step, the illumination correction is executed by means of the nonnegative least-squares method and thereafter the object recognition (image comparison) is executed.

However, the conventional techniques which have been explained above involve the following problems or drawbacks. The target object in front of a photographing device (camera, video camera, etc.) generally moves in the 3-D space (parallel translation, rotation, etc.) unless the position/pose of the target object is fixed or adjusted. Further, the illumination conditions vary every moment when the photographing of the target object is done outdoors. Therefore, the appearance of the 2-D input image of the target object is necessitated to vary widely. The conventional techniques could not compensate for and absorb enough the variations in the position/pose of the target object and the illumination conditions, thereby the application of the conventional image comparison techniques used to be confined within narrow limits. In the following, the problems in the conventional techniques of the above documents will be described in detail.

The "face image comparison device" of the document No. 1 employing the simple image comparison between 2-D images can not cope with variations of appearance in 2-D images caused by changes of the pose of the target object (3-D rotation, etc.), illumination conditions, etc. Therefore, the application of the technique of the document No. 1 is extremely limited.

The image comparison technique employed by the "personal identification device" of the document No. 2 requires 3-D shapes not only in the registration step but also in the comparison step. A 3-D shape measurement device (3-D shape color measurement section 23) becomes necessary on each comparison (personal identification), and thus the cost for the comparison is necessitated to be high, especially when the measurement of the target object has to be done away from the 3-D shape color measurement section 21 which is used for the registration step, or when the measurement of the target objects has to be done at many places. Further, for the measurement of the 3-D shape, each object has to stand still until the measurement is completed, and a darkroom etc. becomes necessary for obtaining precise data. Therefore, the application of the technique of the document No. 2 is also limited.

The technique employed by the "personal identification device" of the document No. 3, which detects pixel positions (feature points) where variations in intensity are large, is effective for comparing objects such as blocks (having large 3-D curvatures), black marks on a white board (steep change of reflectance), etc. However, the technique is not suitable for comparison of human faces as mentioned in the document, which means that stable and reliable detection of the feature points is difficult. The document No. 3 also refers to a correction of pose by use of a standard 3-D shape of target objects, however, the method can not be employed unless the objects are similar in shape.

In the technique disclosed in the document No. 4, enormous amount of 2-D sample images have to be gathered, taking the possibilities of various illumination conditions (two or more point sources, extra lights other than point sources, etc.) into consideration. Further, the shape of the manifold in the feature space is not defined in the document at all, therefore, it is difficult to find appropriate sets of parameters (concerning illumination conditions, pose of the object, etc.) when the distance calculation section 75 calculates the distance between the input image and the manifold in the feature space. Therefore, large amounts of calculations are necessary for implementing the technique of the document No. 4.

The "illumination subspace method" and the "sampling method" disclosed in the document No. 5 require images of the registered object illuminated from many directions. A specially designed lighting unit has to be used in the registration step, and precise setting of the illumination conditions is difficult from the viewpoints of placement and setting of equipment.

Further, in the "illumination subspace method" and the "sampling method", if the position or pose of an object changed, images of the object in the new pose have to be obtained again under a lot of illumination conditions, and the calculations have to be done all over again. Therefore, in the registration step, a huge amount of images of the registered object in various feasible poses have to be obtained under a lot of illumination conditions, taking much time and manpower. If the target object is photographed in the comparison step in a different pose, the comparison becomes impossible.

The "illumination subspace method" requires large amounts of calculation for obtaining the extreme rays, depending on the complexity of the shape. According to the document No. 5, when there are M independent normal vectors on the surface of the object, the number of the extreme rays amounts to M(M−1) at the maximum. Therefore, an enormous amount of extreme rays have to be calculated unless the shape of the object is very simple as a block. Therefore, it is very difficult to calculate all the extreme rays for ordinary objects having complex shapes. Further, the method can not be directly applied to cases where the object has a concavity and thereby a cast shadow occurs.

In the "illumination subspace method" and the "sampling method", the amount of calculations in the nonnegative least-squares method also tends to be enormous depending on the number of extreme rays. In addition to the above problems, the sampling method also has a problem that it is not clear how many basis images are necessary for obtaining satisfactory result and performance.

Further, the "illumination subspace method" and the "sampling method" have been constructed assuming that the surface reflectance property of each object is perfect scattering. Therefore, the methods can not be applied directly to cases where mirror reflection exists or cases where the surface reflectance property is diffusion reflection but not perfect scattering. The majority of ordinary objects do not exhibit the surface perfect scattering.

SUMMARY OF THE INVENTION

It is therefore the primary object of the present invention to provide an image comparison device and an image comparison method by which the comparison step can be conducted by use of a 2-D image of the target object obtained by use of an ordinary camera, without needing a 3-D shape of the target object as the input data.

Another object of the present invention is to provide an image comparison device and an image comparison method by which the comparison of objects can be conducted correctly compensating for and absorbing the three-dimensional changes of the position/pose of the target object in the input image, necessary data of the registered objects can be gathered in the registration step easily, and the correction of illumination conditions can be conducted with regard to the input image (which can be obtained under various illumination conditions) at high processing speed.

In accordance with a first aspect of the present invention, there is provided an image comparison device comprising a registration means and a comparison means. The registration means obtains and registers 3-D data of all or part of one or more registered objects. The comparison means obtains 2-D data of a target object and compares the obtained 2-D data with the data registered in the registration means for conducting judgment concerning the similarity/sameness between the target object and each of the one or more registered objects.

In accordance with a second aspect of the present invention, in the first aspect, the comparison means includes a photographing means, a position/pose determination means, an illumination correction means, an image comparison means and a judgment means. The photographing means photographs the target object and thereby obtains an input image. The position/pose determination means determines the position/pose of the target object in the input image obtained by the photographing means. The illumination correction means generates an image of each registered object in the same position/pose as the target object in the input image and under an illumination condition most similar to that of the input image as a reference image, by use of the position/pose determined by the position/pose determination means and the data registered in the registration means. The image comparison means compares each reference image generated by the illumination correction means with the input image obtained by the photographing means and thereby calculates an evaluation value concerning the similarity between the two images. The judgment means judges whether or not each of the registered objects registered in the registration means is the same as or similar to the target object photographed by the photographing means based on the evaluation value calculated by the image comparison means.

In accordance with a third aspect of the present invention, in the second aspect, the registration means includes a 3-D shape measurement means, a reflectance measurement means and a data storage means. The 3-D shape measurement means measures the 3-D shape of each registered object. The reflectance measurement means measures the reflectance at each position on the surface of the 3-D shape of the registered object. The data storage means stores the 3-D shapes measured by the 3-D shape measurement means and the reflectance measured by the reflectance measurement means as the registered data.

In accordance with a fourth aspect of the present invention, in the second aspect, the registration means includes a 3-D shape measurement means, a color/intensity measurement means and a data storage means. The 3-D shape measurement means measures the 3-D shapes of all or part of the one or more registered objects. The color/intensity measurement means photographs the registered object and thereby obtains information concerning color or intensity of the registered object. The data storage means stores the 3-D shapes measured by the 3-D shape measurement means and the color/intensity information obtained by the color/intensity measurement means as the registered data.

In accordance with a fifth aspect of the present invention, in the second aspect, the registration means includes a 3-D shape measurement means, an average shape generation means, a reflectance measurement means and a data storage means. The 3-D shape measurement means measures the 3-D shapes of all or part of the one or more registered objects. The average shape generation means generates an average 3-D shape as the average of one or more of the 3-D shapes measured by the 3-D shape measurement means. The reflectance measurement means measures the reflectance at each position on the surface of the 3-D shape of the registered object. The data storage means stores the 3-D shapes measured by the 3-D shape measurement means, the average 3-D shape generated by the average shape generation means and the reflectance measured by the reflectance measurement means as the registered data.

In accordance with a sixth aspect of the present invention, in the second aspect, the illumination correction means includes an image generation means and an illumination condition estimation means. The image generation means generates images of each registered object in the same position/pose as the target object in the input image and under various illumination conditions as illumination variation images, by use of the position/pose estimated by the position/pose determination means and the data registered in the registration means. The illumination condition estimation means generates an image that is the most similar to the input image obtained by the photographing means by use of the illumination variation images generated by the image generation means, and outputs the generated image to the image comparison means as the reference image.

In accordance with a seventh aspect of the present invention, in the sixth aspect, the illumination correction means further includes an illumination variation image space generation means. The illumination variation image space generation means generates an illumination variation image space which is spanned by the illumination variation images generated by the image generation means. The illumination condition estimation means generates the image that is the most similar to the input image from the illumination variation image space generated by the illumination variation image space generation means, and outputs the generated image to the image comparison means as the reference image.

In accordance with an eighth aspect of the present invention, in the seventh aspect, the illumination variation image space generation means generates basis vectors of a space that almost accommodates image variation due to the illumination variation by conducting principal component analysis (PCA) to the illumination variation images generated by the image generation means. The illumination condition estimation means obtains inner products between the input image obtained by the photographing means and each of the basis vectors generated by the illumination variation image space generation means, generates the image that is the most similar to the input image by use of the basis vectors and based on the inner products, and outputs the generated image to the image comparison means as the reference image.

In accordance with a ninth aspect of the present invention, in the sixth aspect, the illumination correction means further includes an illumination condition variation means. The illumination condition variation means sets various illumination conditions and outputs the illumination conditions to the image generation means.

In accordance with a tenth aspect of the present invention, in the second aspect, the registration means includes a 3-D shape measurement means a texture image photographing means and a data storage means. The 3-D shape measurement means measures the 3-D shape of each registered object. The texture image photographing means photographs the registered object under various illumination conditions and thereby obtains texture images of the registered object. The data storage means stores the 3-D shapes measured by the 3-D shape measurement means and the texture images obtained by the texture image photographing means as the registered data. The illumination correction means includes an image generation means and an illumination condition estimation means. The image generation means generates images of each registered object in the same position/pose as the target object in the input image and under various illumination conditions as illumination variation images, by use of the position/pose determined by the position/pose determination means and the 3-D shapes and the texture images of the registered object registered in the registration means. The illumination condition estimation means generates an image that is the most similar to the input image obtained by the photographing means by use of the illumination variation images generated by the image generation means, and outputs the generated image to the image comparison means as the reference image.

In accordance with an eleventh aspect of the present invention, in the tenth aspect, the illumination correction means further includes an illumination variation image space generation means. The illumination variation image space generation means generates an illumination variation image space which is spanned by the illumination variation images generated by the image generation means. The illumination condition estimation means generates the image that is the most similar to the input image from the illumination variation image space generated by the illumination variation image space generation means, and outputs the generated image to the image comparison means as the reference image.

In accordance with a twelfth aspect of the present invention, in the eleventh aspect, the illumination variation image space generation means generates basis vectors of a space that almost accommodates image variation due to the illumination variation by conducting the principal component analysis (PCA) to the illumination variation images generated by the image generation means. The illumination condition estimation means obtains inner products between the input image obtained by the photographing means and each of the basis vectors generated by the illumination variation image space generation means, generates the image that is the most similar to the input image by use of the basis vectors and based on the inner products, and outputs the generated image to the image comparison means as the reference image.

In accordance with a thirteenth aspect of the present invention, in the second aspect, the position/pose determination means outputs a predetermined position/pose to the illumination correction means.

In accordance with a fourteenth aspect of the present invention, in the second aspect, the position/pose determination means receives inputs concerning position/pose from outside, and outputs the received position/pose to the illumination correction means.

In accordance with a fifteenth aspect of the present invention, in the second aspect, the position/pose determination means estimates the position/pose of the target object in the input image obtained by the photographing means, and outputs the estimated position/pose to the illumination correction means.

In accordance with a sixteenth aspect of the present invention, in the fifteenth aspect, the registration means includes a 3-D shape measurement means, a reflectance measurement means, a first feature point extraction means and a data storage means. The 3-D shape measurement means measures the 3-D shape of each registered object. The reflectance measurement means measures the reflectance at each position on the surface of the 3-D shape of the registered object. The first feature point extraction means extracts feature points of the registered object based on the 3-D shape measured by the 3-D shape measurement means and the reflectance measured by the reflectance measurement means, and obtains the positions of the extracted feature points. The data storage means stores the 3-D shapes measured by the 3-D shape measurement means, the reflectance measured by the reflectance measurement means and the feature point positions obtained by the first feature point extraction means as the registered data. The position/pose determination means includes a second feature point extraction means and a position/pose calculation means. The second feature point extraction means extracts feature points corresponding to those extracted by the first feature point extraction means from the input image obtained by the photographing means, and obtains the positions of the extracted feature points. The position/pose calculation means estimates the position/pose of the target object in the input image based on the 3-D shape and the feature point positions stored in the data storage means and the input image feature point positions obtained by the second feature point extraction means, and outputs the estimated position/pose to the illumination correction means.

In accordance with a seventeenth aspect of the present invention, in the sixteenth aspect, the illumination correction means includes an image generation means and an illumination condition estimation means. The image generation means generates images of each registered object in the same position/pose as the target object in the input image and under various illumination conditions as illumination variation images, by use of the position/pose estimated by the position/pose determination means and the 3-D shape and the reflectance stored in the data storage means. The illumination condition estimation means generates an image that is the most similar to the input image obtained by the photographing means by use of the illumination variation images generated by the image generation means, and outputs the generated image to the image comparison means as the reference image.

In accordance with an eighteenth aspect of the present invention, in the seventeenth aspect, the illumination correction means further includes an illumination variation image space generation means, The illumination variation image space generation means generates an illumination variation image space which is spanned by the illumination variation images generated by the image generation means. The illumination condition estimation means generates the image that is the most similar to the input image from the illumination variation image space generated by the illumination variation image space generation means, and outputs the generated image to the image comparison means as the reference image.

In accordance with a nineteenth aspect of the present invention, in the eighteenth aspect, the illumination variation image space generation means generates basis vectors of a space that almost accommodates image variation due to the illumination variation by conducting principal component analysis (PCA) to the illumination variation images generated by the image generation means. The illumination condition estimation means obtains inner products between the input image obtained by the photographing means and each of the basis vectors generated by the illumination variation image space generation means, generates the image that is the most similar to the input image by use of the basis vectors and based on the inner products, and outputs the generated image to the image comparison means as the reference image.

In accordance with a twelfth aspect of the present invention, in the nineteenth aspect, the illumination correction means further includes an illumination condition variation means. The illumination condition variation means sets various illumination conditions and outputs the illumination conditions to the image generation means.

In accordance with a twenty-first aspect of the present invention, in the first aspect, the registration means includes a 3-D shape measurement means, a reflectance measurement means, an image generation means, an illumination variation image space generation means and a data storage means. The 3-D shape measurement means measures the 3-D shape of each registered object. The reflectance measurement means measures the reflectance at each position on the surface of the 3-D shape of the registered object. The image generation means generates images of each registered object under various illumination conditions as illumination variation images. The illumination variation image space generation means generates an illumination variation image space which is spanned by the illumination variation images generated by the image generation means. The data storage means stores the illumination variation image space generated by the illumination variation image space generation means as the registered data. The comparison means includes a photographing means, an illumination condition estimation means, an image comparison means and a judgment means. The photographing means photographs the target object and thereby obtains an input image. The illumination condition estimation means generates an image of each registered object that is the most similar to the input image as a reference image, from the illumination variation image space stored in the data storage means. The image comparison means compares each reference image generated by the illumination condition estimation means with the input image obtained by the photographing means, and thereby calculates an evaluation value concerning the similarity between the two images. The judgment means judges whether or not each of the registered objects registered in the registration means is the same as or similar to the target object photographed by the photographing means, based on the evaluation value calculated by the image comparison means.

In accordance with a twenty-second aspect of the present invention, in the twenty-first aspect, the illumination variation image space generation means generates basis vectors of a space that almost accommodates image variation due to the illumination variation, by conducting principal component analysis (PCA) to the illumination variation images generated by the image generation means. The data storage means stores the basis vectors generated by the illumination variation image space generation means as the registered data. The illumination condition estimation means obtains inner products between the input image obtained by the photographing means and each of the basis vectors stored in the data storage means, generates the image that is the most similar to the input image by use of the basis vectors and based on the inner products, and outputs the generated image to the image comparison means as the reference image.

In accordance with a twenty-third aspect of the present invention, in the third aspect, the 3-D shape measurement means obtains the 3-D shapes by reading data or drawings.

In accordance with a twenty-fourth aspect of the present invention, in the fourth aspect, the 3-D shape measurement means obtains the 3-D shapes by reading data or drawings.

In accordance with a twenty-fifth aspect of the present invention, in the tenth aspect, the 3-D shape measurement means obtains the 3-D shapes by reading data or drawings.

In accordance with a twenty-sixth aspect of the present invention, in the third aspect, the reflectance measurement means obtains the reflectance by reading data or drawings.

In accordance with a twenty-seventh aspect of the present invention, in the second aspect, the photographing means obtains the input image by scanning a film, a photograph or printed matter.

In accordance with a twenty-eighth aspect of the present invention, in the second aspect, the judgment means judges which registered object matches the target object.

In accordance with a twenty-ninth aspect of the present invention, in the second aspect, the judgment means searches for one or more registered objects that are similar to the target object.

In accordance with a thirtieth aspect of the present invention, in the first aspect, the registration means registers automobiles as the registered objects.

In accordance with a thirty-first aspect of the present invention, in the first aspect, the registration means registers human faces as the registered objects.

In accordance with a thirty-second aspect of the present invention, there is provided an image comparison method comprising a registration step and a comparison step. In the registration step, 3-D data of all or part of one or more registered objects are obtained and registered. In the comparison step, 2-D data of a target object is obtained and the obtained 2-D data is compared with the data registered in the registration step for conducting judgment concerning the similarity/sameness between the target object and each of the one or more registered objects.

In accordance with a thirty-third aspect of the present invention, in the thirty-second aspect, the comparison step includes a photographing step, a position/pose determination step, an illumination correction step, an image comparison step and a judgment step. In the photographing step, the target object is photographed and thereby an input image is obtained. In the position/pose determination step, the position/pose of the target object in the input image obtained in the photographing step is determined. In the illumination correction step, an image of each registered object in the same position/pose as the target object in the input image and under an illumination condition most similar to that of the input image is obtained as a reference image, by use of the position/pose determined in the position/pose determination step and the data registered in the registration step. In the image comparison step, each reference image generated in the illumination correction step is compared with the input image obtained in the photographing step, and thereby an evaluation value concerning the similarity between the two images is calculated. In the judgment step, it is judged whether or not each of the registered objects registered in the registration step is the same as or similar to the target object photographed in the photographing step, based on the evaluation value calculated in the image comparison step.

In accordance with a thirty-fourth aspect of the present invention, in the thirty-third aspect, the registration step includes a 3-D shape measurement step, a reflectance measurement step and a data storage step. In the 3-D shape measurement step, the 3-D shape of each registered object is measured. In the reflectance measurement step, the reflectance at each position on the surface of the 3-D shape of the registered object is measured. In the data storage step, the 3-D shapes measured in the 3-D shape measurement step and the reflectance measured in the reflectance measurement step are stored as the registered data.

In accordance with a thirty-fifth aspect of the present invention, in the thirty-third aspect, the registration step includes a 3-D shape measurement step, a color/intensity measurement step and a data storage step. In the 3-D shape measurement step, the 3-D shapes of all or part of the one or more registered objects are measured. In the color/intensity measurement step, the registered object is photographed and thereby information concerning color or intensity of the registered object is obtained. In the data storage step, the 3-D shapes measured in the 3-D shape measurement step and the color/intensity information obtained in the color/intensity measurement step are stored as the registered data.

In accordance with a thirty-sixth aspect of the present invention, in the thirty-third aspect, the registration step includes a 3-D shape measurement step, an average shape generation step, a reflectance measurement step and a data storage step. In the 3-D shape measurement step, the 3-D shapes of all or part of the one or more registered objects are measured. In the average shape generation step, an average 3-D shape is generated as the average of one or more of the 3-D shapes measured in the 3-D shape measurement step. In the reflectance measurement step, the reflectance at each position on the surface of the 3-D shape of the registered object is measured. In the data storage step, the 3-D shapes measured in the 3-D shape measurement step, the average 3-D shape generated in the average shape generation step and the reflectance measured in the reflectance measurement step are stored as the registered data.

In accordance with a thirty-seventh aspect of the present invention, in the thirty-third aspect, the illumination correction step includes an image generation step and an illumination condition estimation step. In the image generation step, images of each registered object in the same position/pose as the target object in the input image and under various illumination conditions are generated as illumination variation images, by use of the position/pose estimated in the position/pose determination step and the data registered in the registration step. In the illumination condition estimation step, an image that is the most similar to the input image obtained in the photographing step is generated as the reference image, by use of the illumination variation images generated in the image generation step.

In accordance with a thirty-eighth aspect of the present invention, in the thirty-seventh aspect, the illumination correction step further includes an illumination variation image space generation step. In the illumination variation image space generation step, an illumination variation image space which is spanned by the illumination variation images generated in the image generation step is generated. In the illumination condition estimation step, the image that is the most similar to the input image is generated as the reference image, from the illumination variation image space generated in the illumination variation image space generation step.

In accordance with a thirty-ninth aspect of the present invention, in the thirty-eighth aspect, in the illumination variation image space generation step, basis vectors of a space that almost accommodates image variation due to the illumination variation are generated by conducting principal component analysis (PCA) to the illumination variation images generated in the image generation step. In the illumination condition estimation step, inner products are obtained between the input image obtained in the photographing step and each of the basis vectors generated in the illumination variation image space generation step, and the image that is the most similar to the input image is generated as the reference image by use of the basis vectors and based on the inner products.

In accordance with a fortieth aspect of the present invention, in the thirty-seventh aspect, the illumination correction step further includes an illumination condition variation step. In the illumination condition variation step, various illumination conditions are set and generated to be used in the image generation step.

In accordance with a forty-first aspect of the present invention, in the thirty-third aspect, the registration step includes a 3-D shape measurement step, a texture image photographing step and a data storage step. In the 3-D shape measurement step, the 3-D shape of each registered object is measured. In the texture image photographing step, the registered object is photographed under various illumination conditions, and thereby texture images of the registered object are obtained. In the data storage step, the 3-D shapes measured in the 3-D shape measurement step and the texture images obtained in the texture image photographing step are stored as the registered data. The illumination correction step includes an image generation step and an illumination condition estimation step. In the image generation step, images of each registered object in the same position/pose as the target object in the input image and under various illumination conditions are generated as illumination variation images, by use of the position/pose determined in the position/pose determination step and the 3-D shapes and the texture images of the registered object registered in the registration step. In the illumination condition estimation step, an image that is the most similar to the input image obtained in the photographing step is generated as the reference image, by use of the illumination variation images generated in the image generation step.

In accordance with a forty-second aspect of the present invention, in the forty-first aspect, the illumination correction step further includes an illumination variation image space generation step. In the illumination variation image space generation step, an illumination variation image space which is spanned by the illumination variation images generated in the image generation step is generated. In the illumination condition estimation step, the image that is the most similar to the input image is generated as the reference image, from the illumination variation image space generated in the illumination variation image space generation step.

In accordance with a forty-third aspect of the present invention, in the forty-second aspect, in the illumination variation image space generation step, basis vectors of a space that almost accommodates image variation due to the illumination variation are generated, by conducting the principal component analysis (PCA) to the illumination variation images generated in the image generation step. In the illumination condition estimation step, inner products are obtained between the input image obtained in the photographing step and each of the basis vectors generated in the illumination variation image space generation step, and the image that is the most similar to the input image is generated as the reference image by use of the basis vectors and based on the inner products.

In accordance with a forty-fourth aspect of the present invention, in the position/pose determination step in the thirty-third aspect, a predetermined position/pose is adopted as the position/pose of the target object in the input image to be used in the illumination correction step.

In accordance with a forty-fifth aspect of the present invention, in the position/pose determination step in the thirty-third aspect, a position/pose inputted from outside is adopted as the position/pose of the target object in the input image to be used in the illumination correction step.

In accordance with a forty-sixth aspect of the present invention, in the position/pose determination step in the thirty-third aspect, the position/pose of the target object in the input image obtained in the photographing step is estimated to be used in the illumination correction step.

In accordance with a forty-seventh aspect of the present invention, in the forty-sixth aspect, the registration step includes a 3-D shape measurement step, a reflectance measurement step, a first feature point extraction step and a data storage step. In the 3-D shape measurement step, the 3-D shape of each registered object is measured. In the reflectance measurement step, the reflectance at each position on the surface of the 3-D shape of the registered object is measured. In the first feature point extraction step, feature points of the registered object are extracted based on the 3-D shape measured in the 3-D shape measurement step and the reflectance measured in the reflectance measurement step, and the positions of the extracted feature points are obtained. In the data storage step, the 3-D shapes measured in the 3-D shape measurement step, the reflectance measured in the reflectance measurement step and the feature point positions obtained in the first feature point extraction step are stored as the registered data. The position/pose determination step includes a second feature point extraction step and a position/pose calculation step. In the second feature point extraction step, feature points corresponding to those extracted in the first feature point extraction step are extracted from the input image obtained in the photographing step, and the positions of the extracted feature points are obtained, In the position/pose calculation step, the position/pose of the target object in the input image is estimated based on the 3-D shape and the feature point positions stored in the data storage step and the input image feature point positions obtained in the second feature point extraction step.

In accordance with a forty-eighth aspect of the present invention, in the forty-seventh aspect, the illumination correction step includes an image generation step and an illumination condition estimation step. In the image generation step, images of each registered object in the same position/pose as the target object in the input image and under various illumination conditions are generated as illumination variation images, by use of the position/pose estimated in the position/pose determination step and the 3-D shape and the reflectance stored in the data storage step. In the illumination condition estimation step, an image that is the most similar to the input image obtained in the photographing step is generated as the reference image, by use of the illumination variation images generated in the image generation step.

In accordance with a forty-ninth aspect of the present invention, in the forty-eighth aspect, the illumination correction step further includes an illumination variation image space generation step. In the illumination variation image space generation step, an illumination variation image space which is spanned by the illumination variation images generated in the image generation step is generated. In the illumination condition estimation step, the image that is the most similar to the input image is generated as the reference image, from the illumination variation image space generated in the illumination variation image space generation step.

In accordance with a fiftieth aspect of the present invention, in the forty-ninth aspect, in the illumination variation image space generation step, basis vectors of a space that almost accommodates image variation due to the illumination variation are generated by conducting principal component analysis (PCA) to the illumination variation images generated in the image generation step. In the illumination condition estimation step, inner products are obtained between the input image obtained in the photographing step and each of the basis vectors generated in the illumination variation image space generation step, and the image that is the most similar to the input image is generated as the reference image by use of the basis vectors and based on the inner products.

In accordance with a fifty-first aspect of the present invention, in the fiftieth aspect, the illumination correction step further includes an illumination condition variation step. In the illumination condition variation step, various illumination conditions are set and generated to be used in the image generation step.

In accordance with a fifty-second aspect of the present invention, in the thirty-second aspect, the registration step includes a 3-D shape measurement step, a reflectance measurement step, an image generation step, an illumination variation image space generation step and a data storage step. In the 3-D shape measurement step, the 3-D shape of each registered object is measured. In the reflectance measurement step, the reflectance at each position on the surface of the 3-D shape of the registered object is measured. In the image generation step, images of each registered object under various illumination conditions are generated as illumination variation images. In the illumination variation image space generation step, an illumination variation image space which is spanned by the illumination variation images generated in the image generation step is generated. In the data storage step, the illumination variation image space generated in the illumination variation image space generation step is stored as the registered data. The comparison step includes a photographing step, an illumination condition estimation step, an image comparison step and a judgment step. In the photographing step, the target object is photographed and thereby an input image is obtained. In the illumination condition estimation step, an image of each registered object that is the most similar to the input image is generated as a reference image. from the illumination variation image space stored in the data storage step. In the image comparison step, each reference image generated in the illumination condition estimation step is compared with the input image obtained in the photographing step, and thereby an evaluation value concerning the similarity between the two images is calculated. In the judgment step, it is judged whether or not each of the registered objects registered in the registration step is the same as or similar to the target object photographed in the photographing step, based on the evaluation value calculated in the image comparison step.

In accordance with a fifty-third aspect of the present invention, in the fifty-second aspect, in the illumination variation image space generation step, basis vectors of a space that almost accommodates image variation due to the illumination variation are generated by conducting principal component analysis (PCA) to the illumination variation images generated in the image generation step. In the data storage step, the basis vectors generated in the illumination variation image space generation step are stored as the registered data. In the illumination condition estimation step, inner products are obtained between the input image obtained in the photographing step and each of the basis vectors stored in the data storage step, and the image that is the most similar to the input image is generated as the reference image by use of the basis vectors and based on the inner products.

In accordance with a fifty-fourth aspect of the present invention, in the 3-D shape measurement step in the thirty-fourth aspect, the 3-D shapes are obtained by reading data or drawings.

In accordance with a fifty-fifth aspect of the present invention, in the 3-D shape measurement step in the thirty-fifth aspect, the 3-D shapes are obtained by reading data or drawings.

In accordance with a fifty-sixth aspect of the present invention, in the 3-D shape measurement step in the forty-first aspect, the 3-D shapes are obtained by reading data or drawings.

In accordance with a fifty-seventh aspect of the present invention, in the reflectance measurement step in the thirty-fourth aspect, the reflectance is obtained by reading data or drawings.

In accordance with a fifty-eighth aspect of the present invention, in the photographing step in the thirty-third aspect, the input image is obtained by scanning a film, a photograph or printed matter.

In accordance with a fifty-ninth aspect of the present invention, in the thirty-third aspect, the judgment step is executed for judging which registered object matches the target object.

In accordance with a sixtieth aspect of the present invention, in the thirty-third aspect, the judgment step is executed for searching for one or more registered objects that are similar to the target object.

In accordance with a sixty-first aspect of the present invention, in the thirty-second aspect, automobiles are registered as the registered objects in the registration step.

In accordance with a sixty-second aspect of the present invention, in the thirty-second aspect, human faces are registered as the registered objects in the registration step.

In accordance with sixty-third through ninety-third aspects of the present invention, there are provided machine-readable record mediums storing programs for instructing one or more computers, devices, MPUs (Microprocessor Units), etc. to execute the image comparison methods of the thirty-second through sixty-second aspects of the present invention.

BRIEF DESCRIPTION OF THE DRAWINGS

The objects and features of the present invention will become more apparent from the consideration of the following detailed description taken in conjunction with the accompanying drawings, in which:

FIG. 3 is a schematic block diagram explaining a second conventional image comparison technique in which 3-D shapes are measured both in the registration step and the comparison step;

FIG. 4 is a schematic block diagram explaining a third conventional image comparison technique in which 2-D images are obtained both in the registration step and the comparison step and a standard 3-D shape model is used for the correction of position/pose of the target object;

FIG. 10 is a schematic block diagram showing the detailed composition and process flow of an illumination correction section of the image comparison device of FIG. 8;

FIG. 11 is a schematic diagram for explaining angles ($\Theta$, $\Phi$) which are used for the setting of illumination conditions;

DESCRIPTION OF THE PREFERRED EMBODIMENTS

Figure 1:
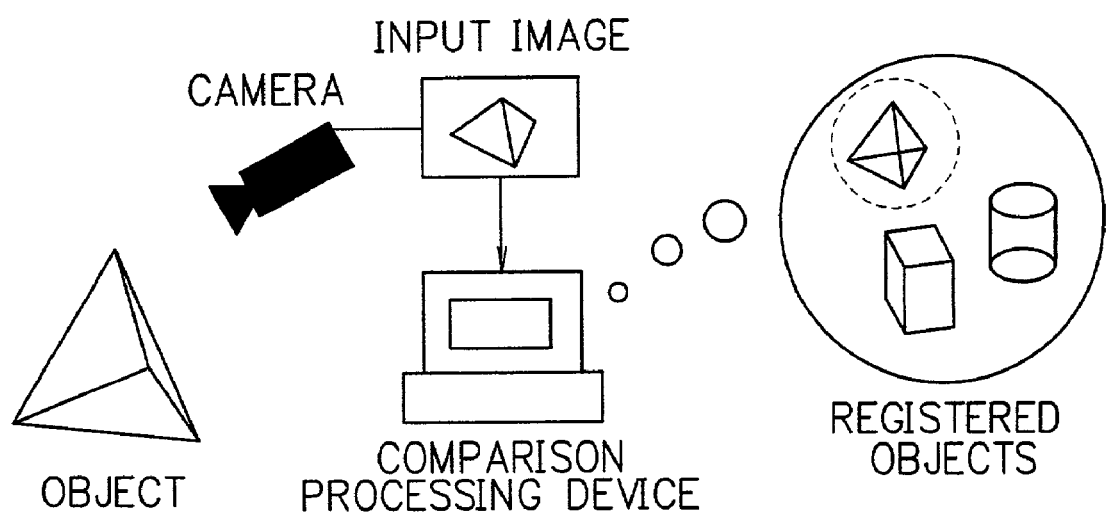
FIG. 1 is a schematic diagram explaining the concept of image comparison.
Figure 2:
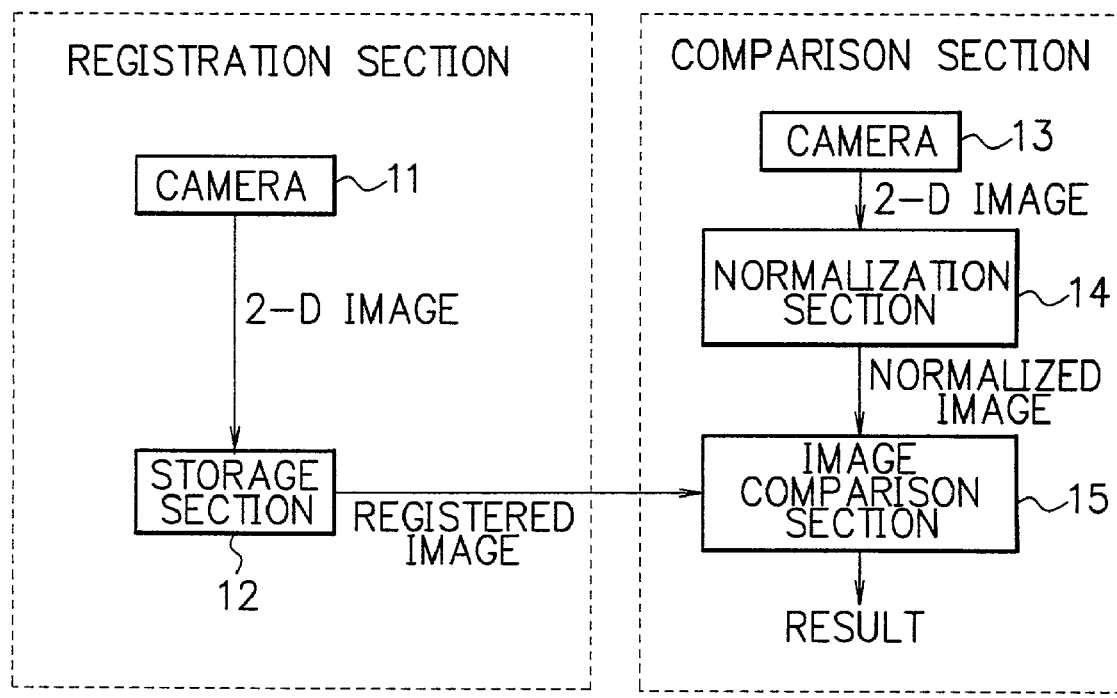
FIG. 2 is a schematic block diagram explaining a first conventional image comparison technique in which 2-D images are used both in the registration step and the comparison step.
Figure 5:
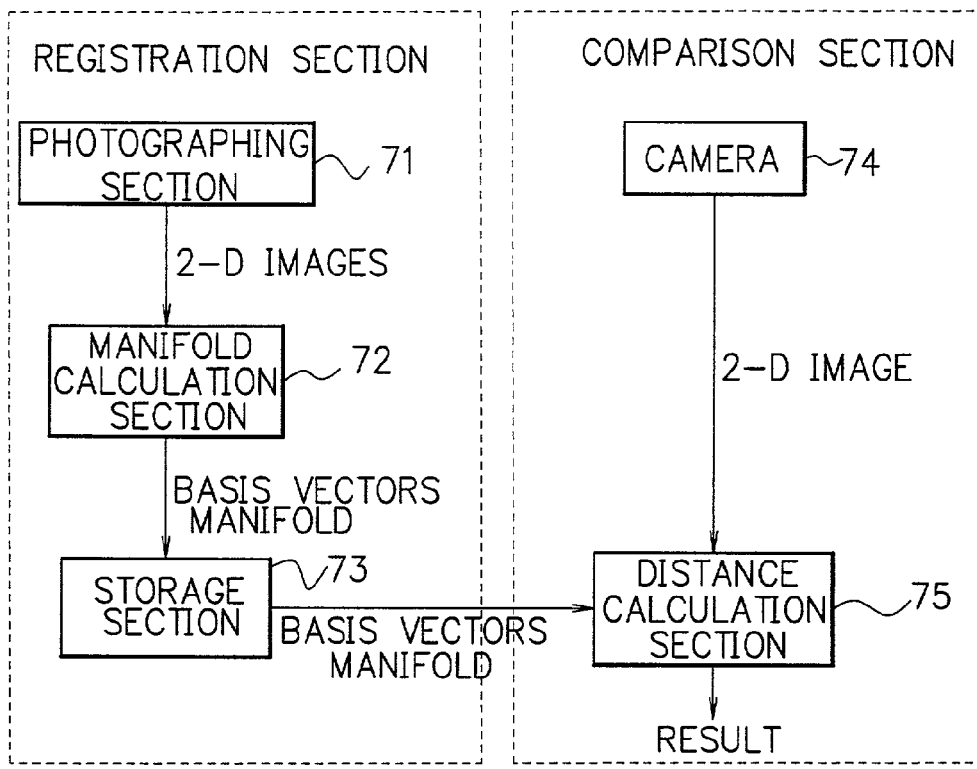
FIG. 5 is a schematic block diagram explaining a fourth conventional image comparison technique in which a large set of 2-D sample images of each registered object are obtained in the registration step by automatically varying pose of the registered object and illumination conditions.
Figure 6:
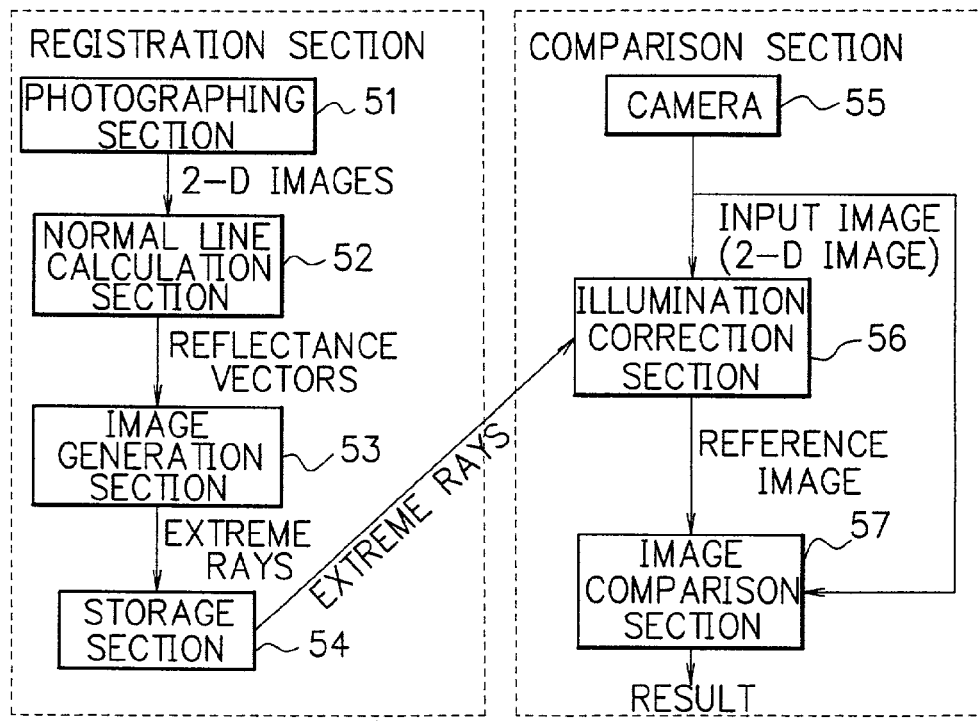
FIG. 6 is a schematic block diagram explaining a fifth conventional image comparison technique in which 2-D images of each registered object are obtained under three or more illumination conditions in the registration step and illumination correction is executed.
Figure 7:
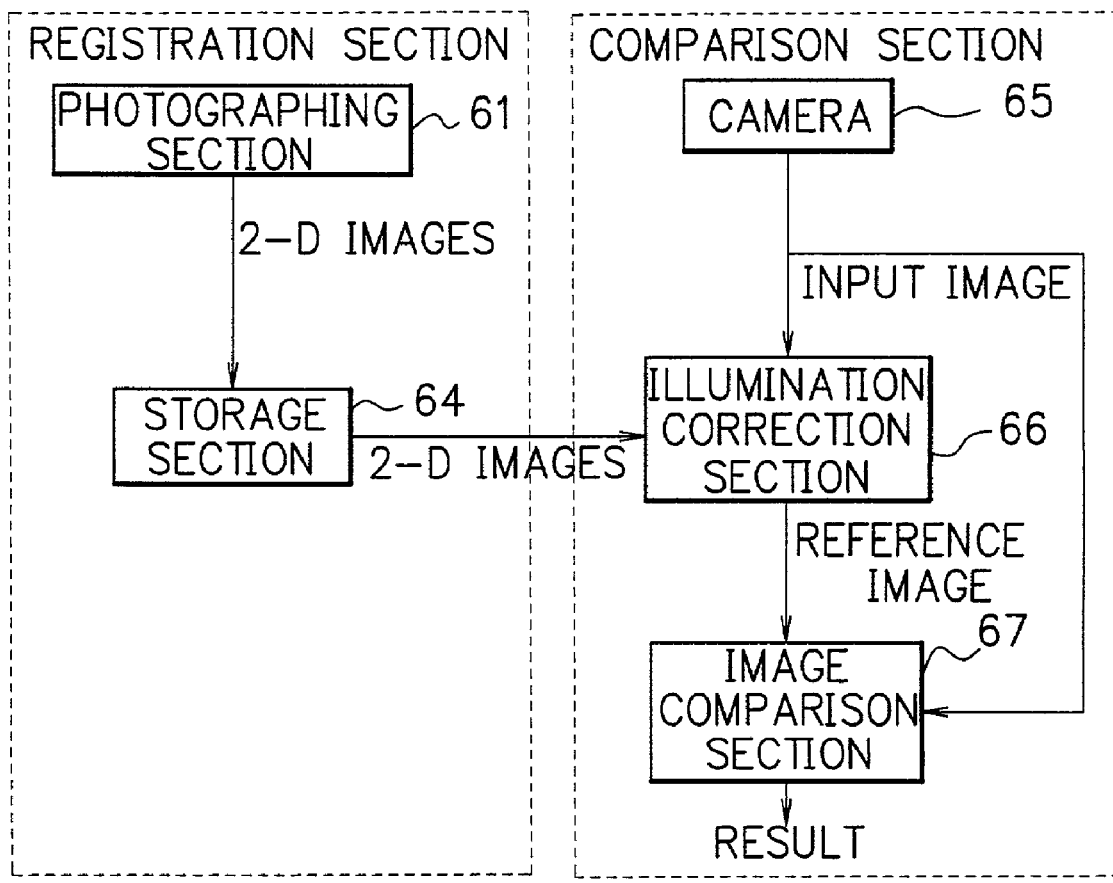
FIG. 7 is a schematic block diagram explaining another conventional image comparison technique in which 2-D images of each registered object are obtained under an appropriate number of illumination conditions in the registration step and illumination correction is executed.

Referring now to the drawings, a description will be given in detail of preferred embodiments in accordance with the present invention.

In the following description, the terms "target object" and "registered object" will be used in the aforementioned meanings. The term "target object" denotes an object to be recognized or identified. The term "registered object" denotes an object which is preliminarily registered to be compared with the target object. The term "registered object" denotes not only "an object that has been registered for comparison" but also "an object that will be registered for comparison".

[Embodiment 1]

Figure 8:
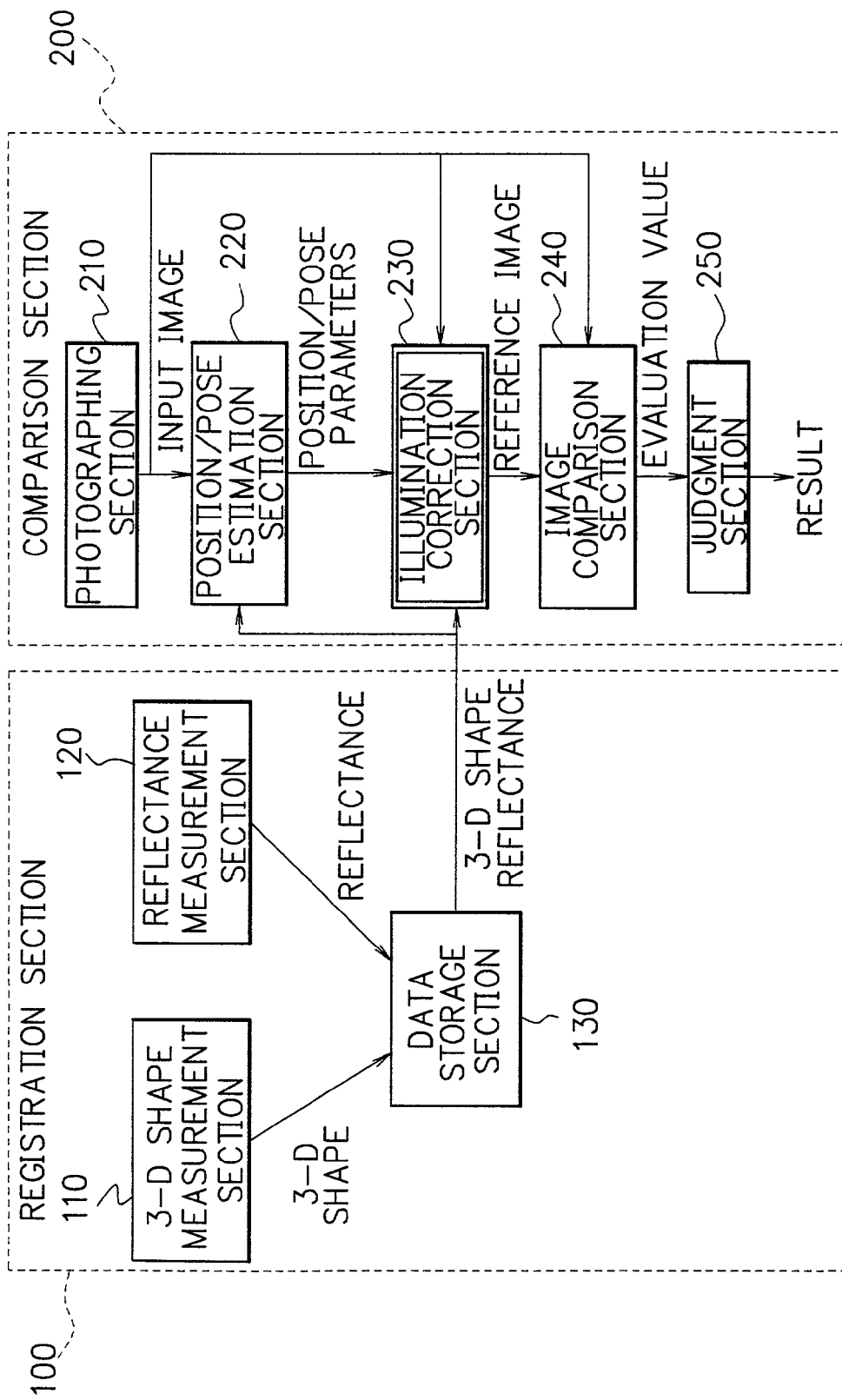
FIG. 8 is a schematic block diagram showing the composition and operation of an image comparison device in accordance with a first embodiment of the present invention.
Figure 9:
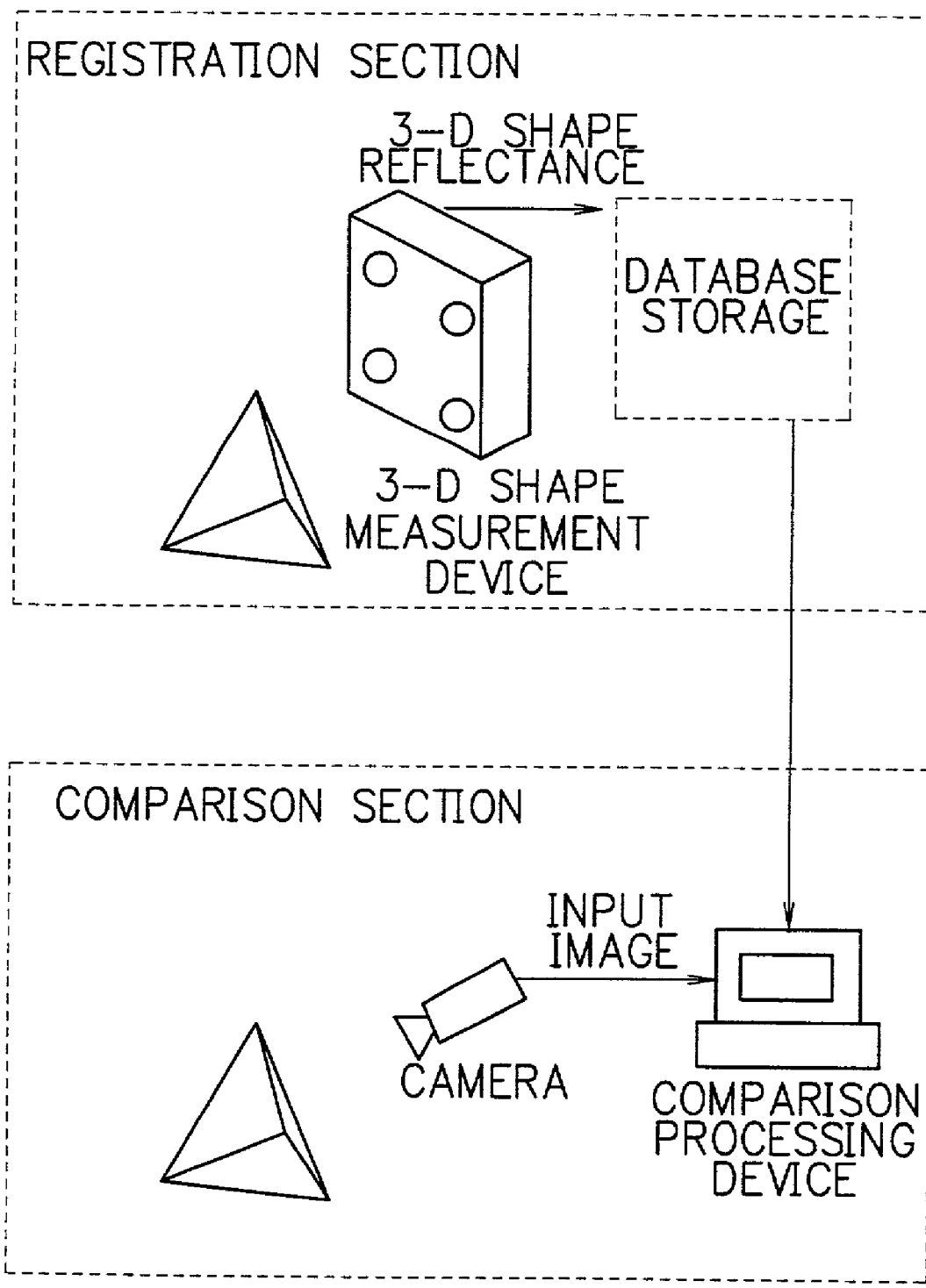
FIG. 9 is a schematic diagram for simply explaining the operation of the image comparison device of FIG. 8.

FIG. 8 is a schematic block diagram showing the composition and operation of an image comparison device in accordance with a first embodiment of the present invention. FIG. 9 is a schematic diagram for simply explaining the operation of the image comparison device of FIG. 8.

Referring to FIG. 8, the image comparison device of the first embodiment is composed of a registration section 100 and a comparison section 200. The registration section 100 measures the 3-D shape of each registered object and the reflectance or color on the surface of the registered object by use of a 3-D shape measurement device, and stores the data. The comparison section 200 obtains a 2-D image of a target object by photographing the target object by use of a camera, video camera, etc., and compares the 2-D image with the data stored in the registration section 100.

The image comparison device of the first embodiment employs the following two principles: First, a 2-D image of a registered object in an arbitrary position/pose under an arbitrary illumination condition can be generated by preliminarily obtaining and registering the 3-D shape and surface reflectance of the registered object. Second, a set of 2-D images of the registered object in the position/pose under various illumination conditions can be expressed as a low-dimensional subspace of the image space.

The registration section 100 includes a 3-D shape measurement section 110, a reflectance measurement section 120 and a data storage section 130.

The 3-D shape measurement section 110 measures the 3-D shape of each registered object and stores the 3-D shape data in the data storage section 130. A 3-D shape measurement device which has been proposed by the present inventor in Japanese Patent Application No. HEI11-123687 can be employed for the 3-D shape measurement section 110, for example. It is of course possible to employ 3-D shape measurement devices of other types.

The reflectance measurement section 120 measures the reflectance of the surface of the registered object corresponding to the 3-D shape, and stores the reflectance data in the data storage section 130. If the 3-D shape measurement device of Japanese Patent Application No. HEI11-123687 is employed, color information (intensity) on the surface of the object can be measured simultaneously with the 3-D shape. The color information (intensity) obtained by such a device can also be substituted for the reflectance data, since color (pixel intensity) can be regarded to be almost proportional to reflectance in images obtained under illumination conditions capable of illuminating the object evenly avoiding shadow.

Various types of setups can be employed for implementing such illumination conditions. For example, a hemispherical scaffold is set up in front of the registered object and an appropriate number of illumination lamps are fixed to the scaffold and turned on for the measurement. It is also possible to employ one or more reflectors in order to diffuse light and illuminate the object uniformly.

The data storage section 130 stores the 3-D shape data and the reflectance data (or color/intensity data) of each registered object. The data (registered data) stored in the data storage section 130 are read out when the comparison step is conducted by the comparison section 200.

The comparison section 200 includes a photographing section 210, a position/pose estimation section 220, an illumination correction section 230, an image comparison section 240 and a judgment section 250.

The photographing section 210 which is provided with a camera, a video camera, etc. photographs a target object and outputs the obtained 2-D image to the position/pose estimation section 220, the illumination correction section 230 and the image comparison section 240 as an input image.

The position/pose estimation section 220 estimates position/pose parameters at the time when the target object was photographed by the photographing section 210. The position/pose parameters include parameters concerning the position/pose of the target object, parameters concerning the photographing device, etc. For example, the position/pose parameters include the position (or translation distance) (Tx, Ty, Tz) of the target object, rotation angles (Rx, Ry, Rz) of the target object (around the x-axis, y-axis and z-axis), the focal length "f" of the camera, and the viewing angle "α" of the camera. The position/pose estimation section 220 is provided with an interactive man-machine interface. The user of the position/pose estimation section 220 adjusts the position/pose parameters manually watching a display screen of the position/pose estimation section 220.

For example, a 2-D image of a registered object is generated by computer graphics by use of the above 8 position/pose parameters, and the generated 2-D CG (computer graphics) image is superimposed on the input image on the screen. The user successively adjusts the parameters so that the two images will be in register and thereby appropriate parameters are determined. The interactive man-machine interface is only an example and various types of devices can be employed for the position/pose estimation section 220. It is also possible to let the position/pose estimation section 220 obtain the position/pose parameters automatically.

In the case of the automatic parameter estimation, the position/pose estimation section 220 successively generates CG images of the registered object in various positions/poses by automatically changing the parameters, compares the generated CG images with the input image, selects a CG image that matches the input image the best, and thereby obtains the position/pose parameters concerning the target object and the photographing device, for example.

The illumination correction section 230 generates a 2-D image (reference image) of the registered object in the above position/pose under an illumination condition that is the most similar to that of the input image, by use of the above parameters determined by the position/pose estimation section 220. In the following, the illumination correction process for generating the reference image of the registered object will be explained in detail.

If we assume that the reflectance property on the surface of the object is perfect scattering and the surface is convex (with no shadow caused by light occlusion by other parts) and the light source exists at an infinite-point, the intensity $I(u, v)$ of each pixel $(u, v)$ of an image can be expressed as the following equation (1), by use of the reflectance $R(u, v)$ and a normal vector $N(u, v)$ corresponding to the pixel $(u, v)$ and the intensity $Ii$ and a direction vector $Li$ of each illumination lamp:

$$I(u, v) = R(u, v) \sum_i \left( \max((Ii\vec{Li} \cdot \vec{N}(u, v)), 0) \right) \quad (1)$$

If we neglect the effect of the "max ( )" in the equation (1), an arbitrary illumination condition (including cases where two or more lamps are used) can be expressed by only one illumination vector L as follows:

$$I(u, v) = R(u, v)\vec{N}(u, v) \cdot \vec{L}\left(\vec{L} = \sum_i Ii\vec{Li}\right) \quad (2)$$

The degree of freedom of images of the object generated by the illumination variation is equal to the number of dimension of the illumination vector L, that is, 3 or less. However, the degree of freedom actually becomes higher due to the effects of the "max ( )", cast shadow occurring on the surface of the object due to light occlusion by other parts, imperfect scattering on the surface, etc. However, most of the images lie in or lie sufficiently close to a three-dimensional subspace. Therefore, actually occurring image variation can be approximated as a low-dimensional subspace. The low-dimensional subspace will hereafter be referred to as an "illumination variation image space".

The principal component analysis (PCA) is used for obtaining basis vectors of the illumination variation image space. A plurality of images of the registered object generated by the illumination variation (hereafter, referred to as "illumination variation images") are prepared, and a set that is composed of all the images generated by the illumination variation is approximated by the illumination variation images. Each of the illumination variation images is generated as an image of the registered object illuminated by a single point source of light at an infinite-point. A plurality of illumination variation images are prepared by setting and changing the direction of the point source of light at appropriate intervals so that all possible directions of the point sources in the photographing of the input image can be covered. An image obtained under two or more illumination lamps can be expressed as the sum of images obtained under each single illumination lamp, therefore, the illumination variation images (each of which is generated as an image obtained under a single point source of light) are enough for generating an image obtained under an arbitrary illumination condition. For the generation of the illumination variation images, the 3-D shape data and the surface reflectance data of the registered object which have been stored in the data storage section 130 are used.

The illumination variation images can be generated by use of basic functions of computer graphics. The details of the computer graphics functions have been described in a document: Mason Woo, Jackie Neider, and Tom Davis "Open GL programming Guide", Addison-Wesley Publishers Japan, for example. In a standard CG (computer graphics) function provided to computers, the reflectance property of the surface of the object is generally assumed to be perfect scattering and only shade is generated (shadow is not generated). However, in this embodiment, a reflectance model that is close to actual surface reflectance property of the object is selected and used. The mirror reflection is taken into consideration and cast shadows are also reproduced by means of ray tracing, in order to generate illumination variation images that are close to images obtained by actually photographing the registered object.

The above illumination variation image generation method by use of the CG functions of a computer is only an example. It is of course possible to generate each illumination variation image by calculating intensity of pixels that will be used for the comparison, by means of numerical calculations.

Hereafter, each image will be expressed by use of a column vector. Each component of the column vector indicates an intensity value of each pixel in an area of the image that will be used for the comparison. When the number of the illumination variation images is N, by expressing each illumination variation image by a vector Ki ($i=1, 2, \ldots, N$), a covariance matrix V can be expressed by the following equation (3).

$$S = [\vec{K}_1 \vec{K}_2 \cdots \vec{K}n] \quad (3)$$
$$V = \frac{1}{N} SS^T$$

Eigenvalues $\rho i$ and eigenvectors Bi ($i=1, 2, \ldots M$) of the covariance matrix V are successively obtained for M largest eigenvalues starting from the largest eigenvalue, and the illumination variation image space of an object "j" is approximated by an M-dimensional linear space $\Psi j$ whose bases are the eigenvectors Bi ($i=1, 2, \ldots M$). The dimension number M of the illumination variation image space may be determined in consideration of precision that is required of the illumination correction process. In the case where M eigenvectors are used, "cumulative contribution" of the M eigenvalues can be calculated as follows:

$$\frac{\sum_{i=1}^{M} \sigma_i}{\sum_{i=1}^{N} \sigma_i} \times 100[\%] \quad (4)$$

The cumulative contribution is an index indicating how precisely the illumination variation image space can express the illumination variation images, when error (difference) between images is evaluated by use of the differences of intensity values between the images. By setting an appropriate threshold value for the cumulative contribution, the dimension number M of the illumination variation image space can be determined automatically by finding a number M necessary for surpassing the threshold value.

FIG. 10 is a schematic block diagram showing the detailed composition and process flow of the illumination correction section 230. The illumination correction section 230 shown in FIG. 10 includes an illumination condition variation section 231, an image generation section 232, an illumination variation image space generation section 233 and an illumination condition estimation section 234.

The illumination condition variation section 231 sets a sufficient number of illumination conditions capable of approximating the illumination variation image space of the object. FIG. 11 is a schematic diagram for explaining angles ($\Theta$, $\Phi$) which are used for the setting of the illumination conditions. Referring to FIG. 11, the direction of a point source of light at an infinite-point seen from the object is expressed by a longitude $\Theta$ and a latitude $\Phi$. The illumination condition variation section 231 changes each angle ($\Theta$, $\Phi$) from $-90°$ to $90°$ at intervals of $10°$ and thereby sets ($19 \times 17 + 2 =$) 325 illumination conditions, for example. The above settings (type of light source, illumination directions (interval, range)) are only an example and other settings can of course be employed.

The image generation section 232 which is provided with CG functions reads the 3-D shape data and the reflectance data of the registered object j from the data storage section 130, and generates the illumination variation images of the registered object j by use of the position/pose parameters supplied from the position/pose estimation section 220 and the illumination conditions supplied from the illumination condition variation section 231.

The above process can be implemented by use of basic functions of a computer which is provided with graphics functions. In the image generation by use of computer graphics, various types of surface reflectance models and camera models can be employed. For example, the pinhole camera model and the perfect scattering model can be employed as the camera model and the surface reflectance model. It is also possible to give shadows to the surface of the object by means of ray tracing, or to give specularity to the surface of the object by use of other reflectance models.

Performance in the image comparison process can be improved by employing precise models (surface reflectance model, light source model, camera model) that are close to reality in the image generation process. The image generation process can also be conducted by numerical calculations of pixel intensity values without using graphics functions.

The illumination variation image space generation section 233 obtains the basis vectors Bi of the illumination variation image space $\Psi j$ according to the procedure following the equation (3) by use of the illumination variation images generated by the image generation section 232, and outputs the obtained basis vectors Bi to the illumination condition estimation section 234 as the illumination variation image space $\Psi j$. In this embodiment, M basis vectors corresponding to the M largest eigenvalues are obtained starting from the largest eigenvalue, and the obtained M basis vectors are outputted as the illumination variation image space $\Psi j$. In order to determine the dimension number M of the illumination variation image space $\Psi j$ so that the cumulative contribution of the equation (4) will surpass a threshold value 95% for example, N (325, for example) eigenvalues are obtained and a number M that satisfies the following equation (5) is obtained (if the number of pixels of each illumination variation image is larger than the number N of the illumination variation images).

$$\frac{\sum_{i=1}^{M} \sigma_i}{\sum_{i=1}^{N} \sigma_i} \geq 0.95 \quad (5)$$

The criterion employed for the determination of the dimension number M can be changed properly.

The illumination condition estimation section 234 which received the illumination variation image space (basis vectors) Ψj from the illumination variation image space generation section 233 generates a reference image (which is the nearest in the illumination variation image space Ψj to the input image) according to the following equation (6), and outputs the generated reference image to the image comparison section 240.

$$\vec{Ic} = \sum_{i=1}^{M} (\vec{Iq} \cdot \vec{Bi})\vec{Bi} \quad (6)$$

where the vector "Iq" denotes an "input image vector" (a vector composed of pixel intensity values of the input image (query image)), and the vector "Ic" denotes the reference vector obtained by the illumination condition estimation section 234. The vector "Bi" (i=1, 2, ... M) denotes the basis vectors of the illumination variation image space Ψj.

The image comparison section 240 calculates an evaluation value concerning the similarity between the input image and the reference image generated by the illumination condition estimation section 234. Various calculation methods can be employed for the evaluation. For example, the sum of squares of pixel intensity differences which is shown in the following equation (7) can be used as the evaluation value. The evaluation value of the equation (7) indicates the distance (D) between the input image and the reference image.

$$D = |\vec{Iq} - \vec{Ic}|^2 \quad (7)$$

A technique elaborated on in a document: Shigeru Akamatsu "Computer Recognition of Human Faces—A Survey—", The Transactions of the Institute of Electronics, Information and Communication Engineers D-II, Vol. J-80-D-II, No. 8, pp. 2131–2146 (1997), can also employed for the evaluation of the similarity between the input image and the reference image.

The judgment section 250 executes judgment (whether or not the target image is the registered image, for example) by use of the evaluation value D calculated above and a threshold value.

For example, for simply judging whether or not the target image is the registered image, the judgment section 250 compares the evaluation value D with a threshold value D' and judges that the target object is the registered object if D<D'.

When two or more objects have been registered as the registered objects, the reference image generation by the illumination correction section 230 and the evaluation value calculation by the image comparison section 240 are repeated for each registered object. In this case, the judgment section 250 can judge which registered object is the most similar to the target object by finding a reference image that gives the smallest evaluation value D (the smallest distance from the input image). It is also possible to let the judgment section 250 search for one or more registered objects that are similar to the target object by finding registered objects giving evaluation values D<D'.

[Embodiment 2]

Figure 12:
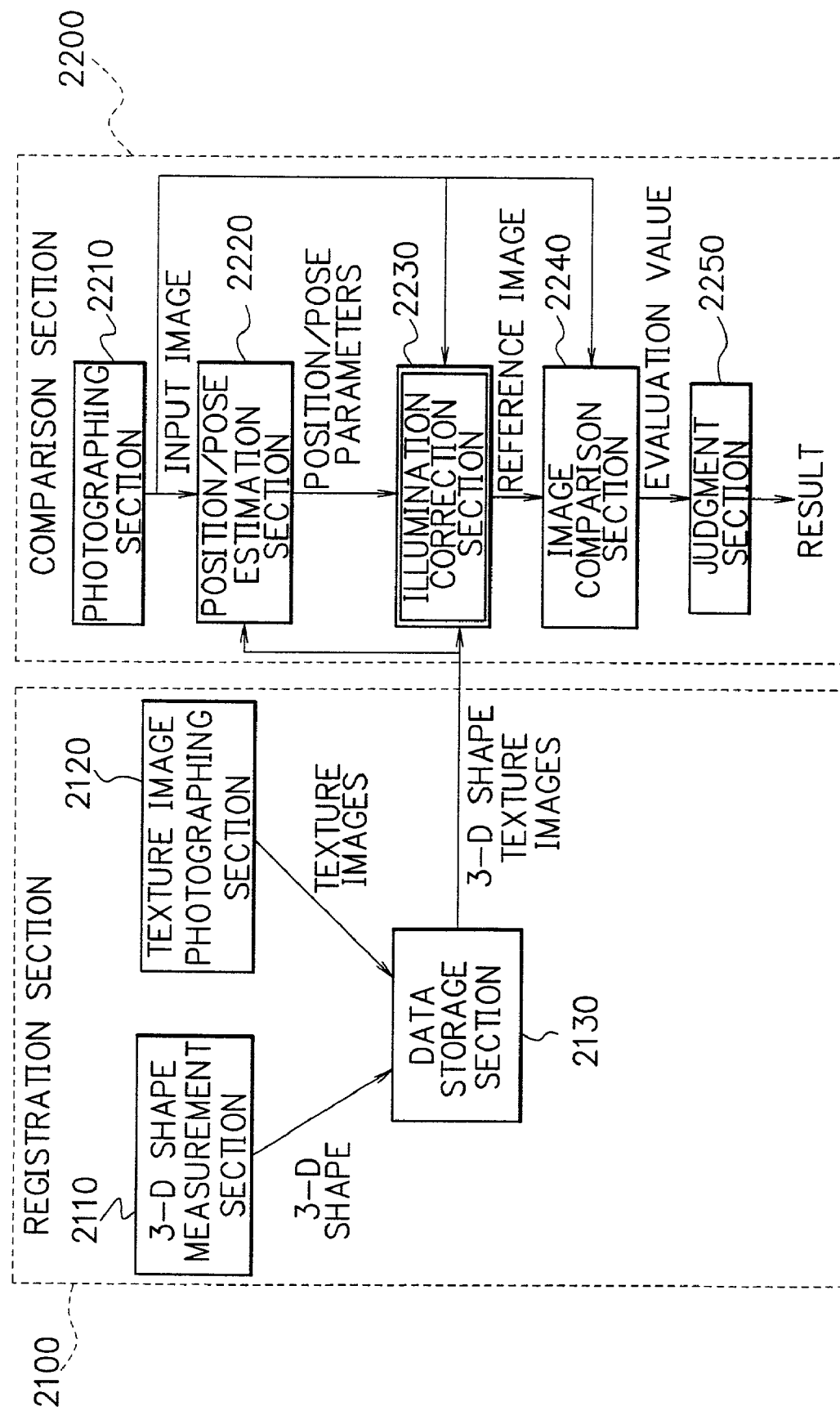
FIG. 12 is a schematic block diagram showing the composition and operation of an image comparison device in accordance with a second embodiment of the present invention.
Figure 13:
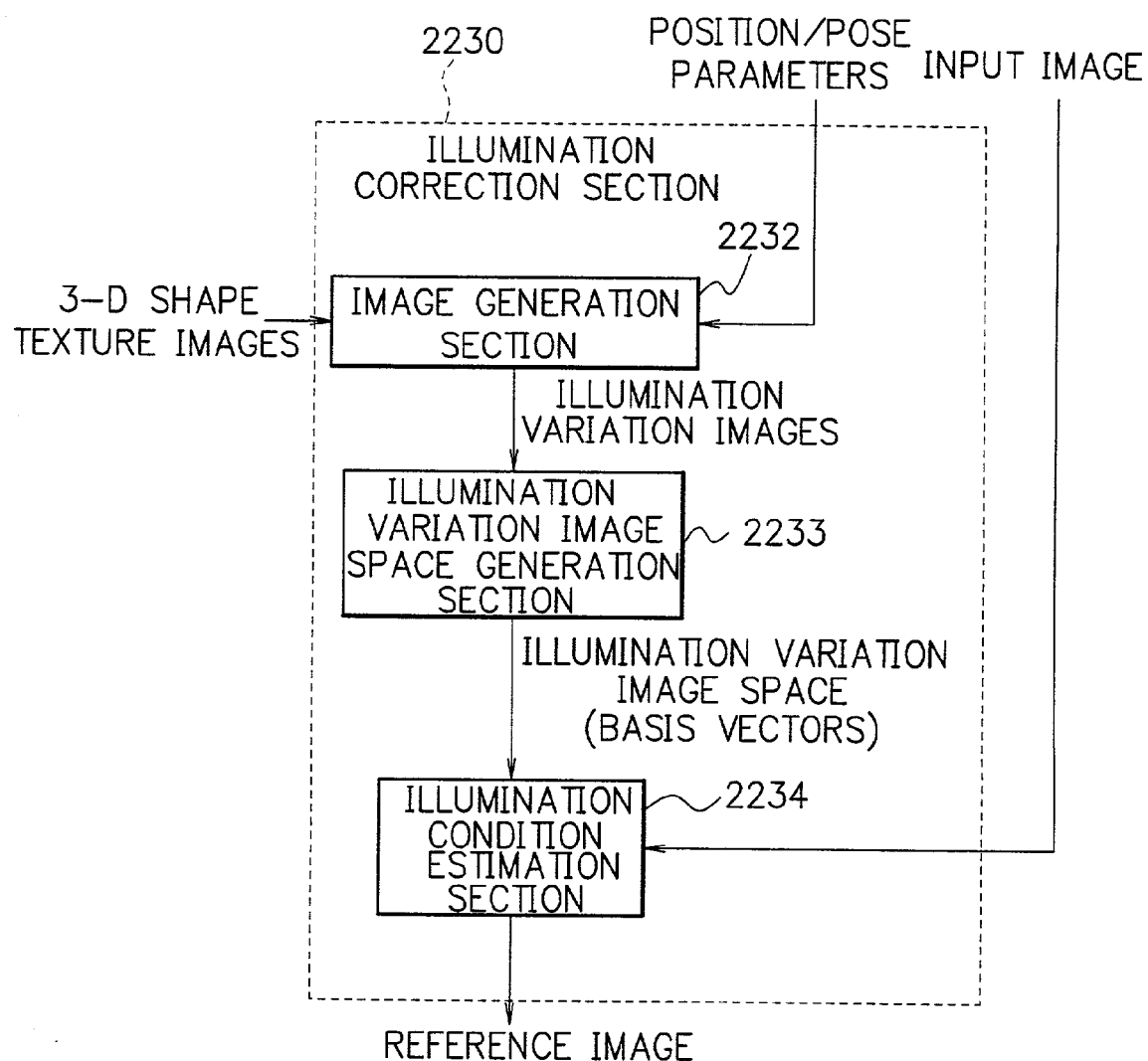
FIG. 13 is a schematic block diagram showing the detailed composition and process flow of an illumination correction section of the image comparison device of FIG. 12.

FIG. 12 is a schematic block diagram showing the composition and operation of an image comparison device in accordance with a second embodiment of the present invention. FIG. 13 is a schematic block diagram showing the detailed composition and process flow of an illumination correction section 2230 of the image comparison device of FIG. 12.

In the second embodiment, 2-D images are obtained for each registered object under two or more illumination conditions instead of measuring the reflectance by use of the reflectance measurement section 120 of the first embodiment. The illumination variation image space is generated by use of the 2-D images obtained under two or more illumination conditions instead of the reflectance. The illumination correction section 2230 of the image comparison device of the second embodiment is not provided with the illumination condition variation section 231 of the first embodiment.

The image comparison device of the second embodiment has been designed employing the following principle: If a sufficient number of illumination conditions (enough for generating sample images capable of generating the illumination variation image space which can accommodate the variation of the image of the registered object depending on illumination conditions) are set and a sufficient number of images of the registered object are preliminarily obtained under the sufficient number of illumination conditions, the sample images for generating the illumination variation image space can be generated without the need of the reflectance measurement, illumination condition setting in the CG image generation, shadow generation by means of ray tracing, etc.

Various types of setups can be employed for implementing the sufficient number of illumination conditions for obtaining texture images of the registered object (to be used for the sample images). For example, a hemispherical scaffold is set up in front of the registered object and an appropriate number of illumination lamps are fixed to the scaffold at even intervals. The registered object is photographed repeatedly by successively turning each lamp on. It is also possible to photograph the registered object repeatedly moving a lamp by a manipulator and turning the lamp on repeatedly.

In the second embodiment, the texture images obtained as above are registered and stored together with the 3-D shape data as the registered data. The comparison step is conducted without executing the illumination condition variation process. Instead of the illumination condition variation process, the stored texture images are successively read out and an image of the registered object in the position/pose estimated by the position/pose estimation process is generated by means of computer graphics so that intensity values on the surface of the registered object in the generated image will be the same as those of the texture images. The generated image is outputted as the sample image. The composition and operation of the image comparison device of the second embodiment will hereafter be explained in detail.

The image comparison device shown in FIG. 12 is composed of a registration section 2100 and a comparison section 2200 similarly to the image comparison device of the first embodiment.

In the registration section 2100, the 3-D shape of each registered object and image data (texture images) of each registered object obtained under two or more illumination conditions are registered and stored as the registered data to be used for the comparison. The registration section 2100 includes a 3-D shape measurement section 2110, a texture image photographing section 2120 and a data storage section 2130.

The 3-D shape measurement section 2110 measures the 3-D shape of each registered object by use of a 3-D shape measurement device such as the device proposed by the present inventor in Japanese Patent Application No. HEI11-123687, and stores the 3-D shape data in the data storage section 2130.

The texture image photographing section 2120 actually sets illumination conditions which are equivalent to those set and outputted by the illumination condition variation section 231 of the first embodiment, and photographs each registered object under the illumination conditions. Various types of setups can be employed for implementing the illumination conditions. For example, a hemispherical scaffold is set up in front of the registered object and an appropriate number of illumination lamps are fixed to the scaffold. Concretely, on the hemisphere (scaffold) ($-90° \leq \Theta \leq 90°$, $-90° \leq \Phi \leq 90°$) shown in FIG. 11, the lamps are fixed to points corresponding to angles ($\Theta$, $\Phi$) from $-90°$ to $90°$ at intervals of $15°$ for example, and the registered object is photographed repeatedly by successively turning each lamp on. It is also possible to photograph the registered object repeatedly moving a lamp by a manipulator and turning the lamp on repeatedly. The texture images obtained above are stored in the data storage section 2130.

The data storage section 2130 stores the 3-D shape data of the registered objects supplied from the 3-D shape measurement section 2110 and the texture images of the registered objects supplied from the texture image photographing section 2120. The registered data are read out when the comparison step is conducted by the comparison section 2200.

The comparison section 2200 includes a photographing section 2210, a position/pose estimation section 2220, an illumination correction section 2230, an image comparison section 2240 and a judgment section 2250.

The photographing section 2210 which is provided with a camera, a video camera, etc. photographs a target object and outputs the obtained 2-D image to the position/pose estimation section 2220, the illumination correction section 2230 and the image comparison section 2240 as an input image.

The position/pose estimation section 2220 estimates position/pose parameters at the time when the target object was photographed by the photographing section 210. The position/pose parameters include parameters concerning the position/pose of the target object, parameters concerning the photographing device, etc. The position/pose parameters include position (Tx, Ty, Tz) of the target object, rotation angles (Rx, Ry, Rz) of the target object, the focal length "f" of the camera, and the viewing angle "α" of the camera, for example. The position/pose estimation section 2220 is provided with an interactive man-machine interface, and the user of the position/pose estimation section 2220 adjusts the position/pose parameters manually watching a display screen of the position/pose estimation section 2220. For example, a 2-D image of a registered object is generated by computer graphics by use of the 8 position/pose parameters, and the generated 2-D CG image is superimposed on the input image on the screen. The user successively adjusts the parameters so that the two images will be in register and thereby appropriate parameters are determined.

The interactive man-machine interface is only an example and various types of devices can be employed for the position/pose estimation section 2220. It is also possible to let the position/pose estimation section 2220 obtain the position/pose parameters automatically. In the case of the automatic parameter estimation, the position/pose estimation section 2220 successively generates CG images of the registered object in various positions/poses by automatically changing the parameters, compares the generated CG images with the input image, selects a CG image that matches the input image the best, and thereby obtains the position/pose parameters concerning the target object and the photographing device, for example.

The illumination correction section 2230 of the second embodiment is not provided with the illumination condition variation section 231 of the first embodiment. Differently from the illumination correction section 230 of the first embodiment, the illumination correction section 2230 generates the illumination variation images using the pixel (intensity) values of the texture images obtained by the texture image photographing section 2120 as the intensity values on the surface of the registered object.

FIG. 13 shows the detailed composition and process flow of the illumination correction section 2230 which is employed in the second embodiment. The illumination correction section 2230 includes an image generation section 2232, an illumination variation image space generation section 2233 and an illumination condition estimation section 2234.

The image generation section 2232 reads out the 3-D shape data and the texture images of a registered object "j", and generates illumination variation images by computer graphics, by use of the position/pose parameters obtained by the position/pose estimation section 2220 and each of the texture images. The process can be conducted by means of "texture mapping", which is a basic function of a computer having graphic functions. In the second embodiment, various types of camera models (such as the pinhole camera model) can be employed. The texture images employed in the second embodiment are actually photographed images, therefore, there is no need to generate shadows and specularity by computer graphics as in the first embodiment.

The illumination variation image space generation section 2233 obtains the basis vectors $B_i$ of the illumination variation image space $\Psi_j$ according to the procedure following the equation (3) by use of the illumination variation images generated by the image generation section 2232, and outputs the obtained basis vectors $B_i$ to the illumination condition estimation section 2234 as the illumination variation image space $\Psi_j$.

The illumination condition estimation section 2234 which received the illumination variation image space (basis vectors) $\Psi_j$ from the illumination variation image space generation section 2233 generates a reference image (which is the nearest in the illumination variation image space $\Psi_j$ to the input image) according to the equation (6), and outputs the generated reference image to the image comparison section 2240.

The image comparison section 2240 calculates an evaluation value D concerning the similarity between the input image and the reference image generated by the illumination condition estimation section 2234.

The judgment section 2250 executes judgment (whether or not the target image is the registered image, for example) by use of the evaluation value D calculated by the image comparison section 2240 and a threshold value. When only one object has been registered as the registered object, the judgment section 2250 compares the evaluation value D with a threshold value D' and thereby judges whether or not the target object is the same as or similar to the registered object. When two or more objects have been registered as the registered objects, the reference image generation by the illumination correction section 2230 and the evaluation value calculation by the image comparison section 2240 are conducted repeatedly for each registered object. In this case, the judgment section 2250 can judge which registered object is the most similar to the target object by finding a reference image that gives the smallest evaluation value D. It is also possible to let the judgment section 2250 search for one or more registered objects that are similar to the target object by finding registered objects giving evaluation values D<D'.

As described above, in the image comparison device in accordance with the second embodiment of the present invention, more time and effort become necessary in the registration step in comparison with the first embodiment since the texture images have to be obtained by actually photographing the registered objects under various illumination conditions. However, numerical calculations for the approximation by use of the low-dimensional space and the processes for generating shadows and specularity can be omitted since the actually photographed texture images are used for the illumination correction process, therefore, processing time necessary for the comparison step can be shortened in comparison with the first embodiment.

[Embodiment 3]

Figure 14:
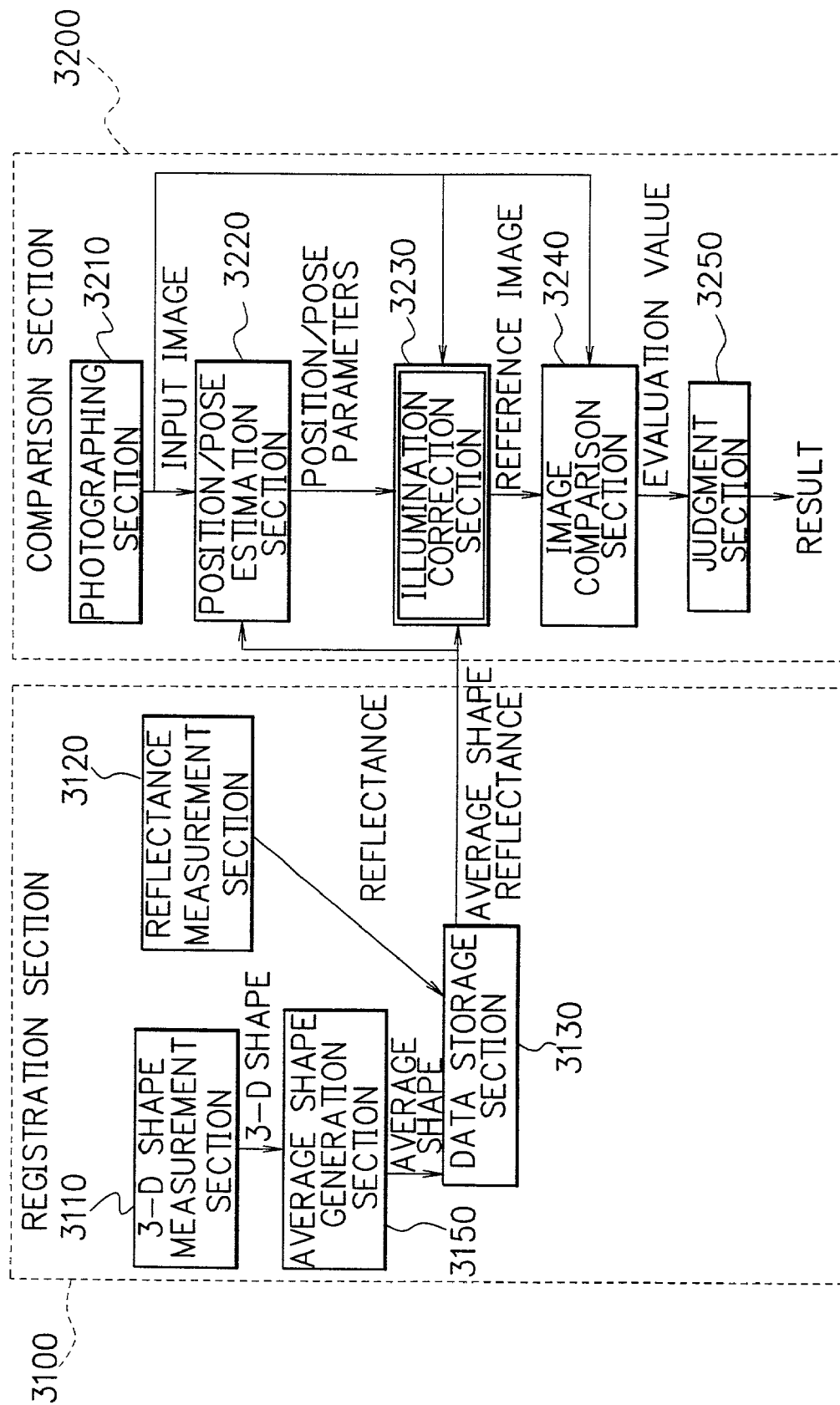
FIG. 14 is a schematic block diagram showing the composition and operation of an image comparison device in accordance with a third embodiment of the present invention.

FIG. 14 is a schematic block diagram showing the composition and operation of an image comparison device in accordance with a third embodiment of the present invention.

While the 3-D shape measurement section 110 of the first embodiment measured the 3-D shapes of all the registered objects, a 3-D shape measurement section 3110 of the third embodiment measures part (one, two,, three etc.) of the registered objects. An average shape generation section 3150 generates an average 3-D shape of the measured registered objects. The average 3-D shape generated by the average shape generation section 3150 is use by a comparison section 3200 of the third embodiment.

The image comparison device of the third embodiment is designed for cases where the shapes of the registered objects are similar. In such cases, the position/pose estimation process and the illumination correction process can be conducted by use of the representative 3-D shape data (average 3-D shape), without measuring and using the 3-D shapes of all the registered objects.

The image comparison device shown in FIG. 14 is composed of a registration section 3100 and a comparison section 3200 similarly to the image comparison device of the previous embodiments.

The registration section 3100 includes a 3-D shape measurement section 3110, a reflectance measurement section 3120, an average shape generation section 3150 and a data storage section 3130.

The 3-D shape measurement section 3110 measures 3-D shapes of registered objects #1 and #2 for example, by use of a 3-D shape measurement device of Japanese Patent Application No. HEI11-123687.

Figure 15A:
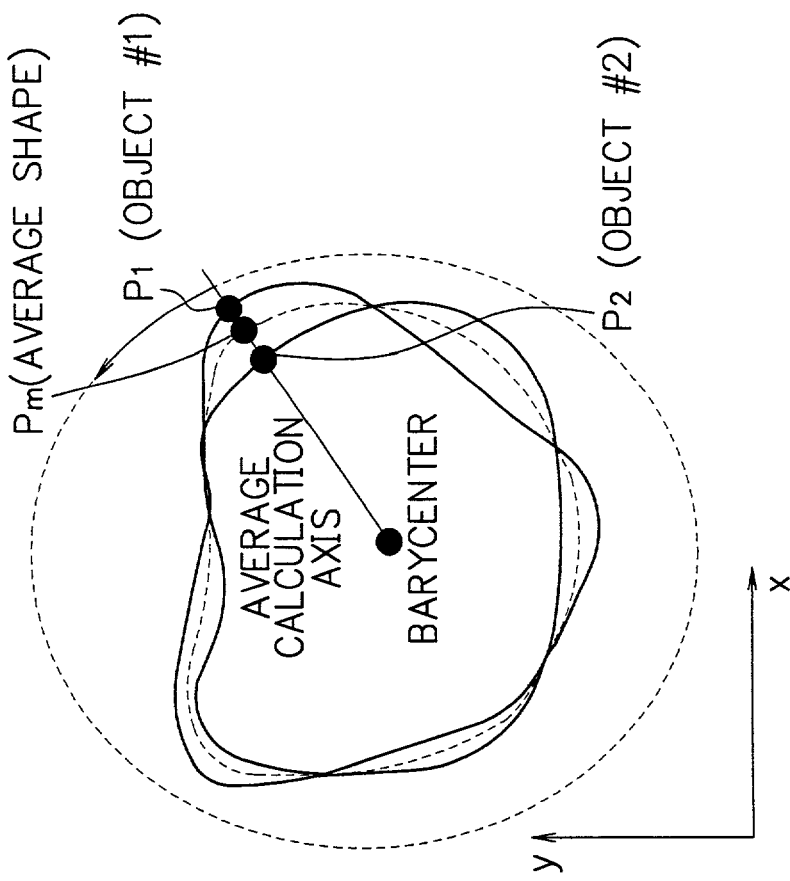
FIGS. 15A and 15B are schematic diagrams for explaining a method for obtaining an average 3-D shape which is employed by an average shape generation section of the image comparison device of FIG. 14.

The average shape generation section 3150 translates the 3-D shape data of the registered object #1 or #2 so that the barycenters of the registered objects #1 and #2 will overlap one another as shown in FIG. 15A, sets sections that are perpendicular to the z-axis at appropriate intervals, and calculates average 2-D shapes on each of the sections.

Figure 15B:
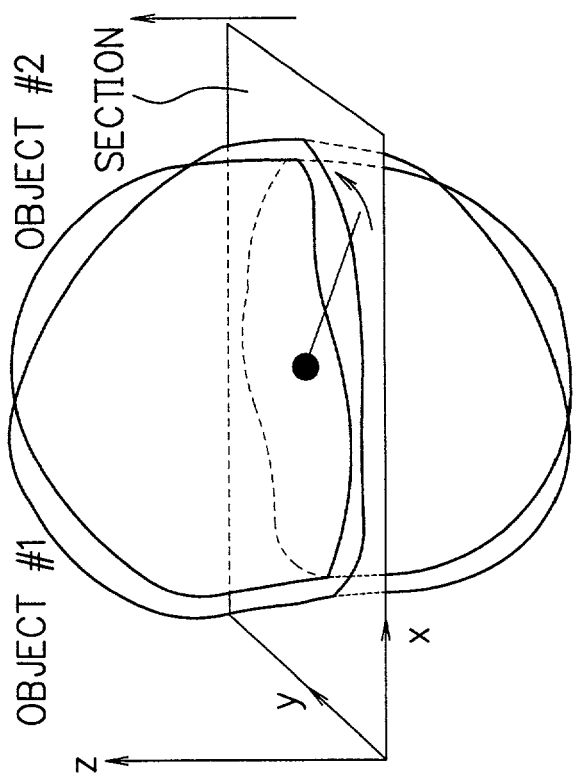

Referring to FIG. 15B showing a section, a line (average calculation line) is drawn outward from the barycenter, and intersection points P1 and P2 of the average calculation line with 2-D shapes of the registered objects #1 and #2 are obtained. The 3-D coordinates of a point Pm on the average 3-D shape (average 2-D shape) are obtained by averaging 3-D coordinates ($x_1$, $y_1$, $z_1$) and ($x_2$, $y_2$, $z_2$) of the surface points P1 and P2 as follows:

$$\left(\frac{x1+x2}{2}, \frac{y1+y2}{2}, \frac{z1+z2}{2}\right) \quad (8)$$

The average shape generation section 3150 repeats the above calculation around the barycenter at proper angle intervals and thereby obtains the average 2-D shape of the registered objects #1 and #2 on the section. The average shape generation section 3150 obtains the average 2-D shapes along the z-axis at appropriate intervals and thereby obtains the average 3-D shape. The obtained average 3-D shape data are stored in the data storage section 3130.

The reflectance measurement section 3120 measures the reflectance of the surface of each registered object (#1, #2) corresponding to the 3-D shape, and stores the reflectance data in the data storage section 3130. If the 3-D shape measurement device of Japanese Patent Application No. HEI11-123687 is employed, color information (intensity) on the surface of the object can be measured simultaneously with the 3-D shape. In the following, the color information (intensity) obtained by the device is substituted for the reflectance data. The correspondence between the average 3-D shape and the color information of each registered object can be set as follows. If we express the 3-D shape data (3-D coordinates) of the registered objects #1 and #2 (which have been used for the calculation of the 3-D coordinates of the average 3-D shape Pm) as "P1" and "P2", reflectance data of the registered object #1 measured on the 3-D shape P1 is used as the reflectance data of the registered object #1 on the average 3-D shape Pm. In the same way, reflectance data of the registered object #2 measured on the 3-D shape P2 is used as the reflectance data of the registered object #1 on the average 3-D shape Pm.

The data storage section 3130 stores the average 3-D shape data supplied from the average shape generation section 3150 and the reflectance data of the registered objects #1 and #2 supplied from the reflectance measurement section 3120.

The operation of the comparison section 3200 is basically the same as that of the comparison section 200 of the first embodiment, except that the average 3-D shape data obtained by the average shape generation section 3150 are read out from the data storage section 3130 as the 3-D shape data of each registered object (#1, #2).

While a case where an average 3-D shape of two registered objects are obtained has been explained above, the number of the registered objects can of course be three or more. It is also possible to partition registered objects into some groups based on similarity of shape and obtaining average 3-D shapes of each group to be used for each group. The number of registered objects that are used for the average 3-D shape calculation can be set properly.

[Embodiment 4]

Figure 16:
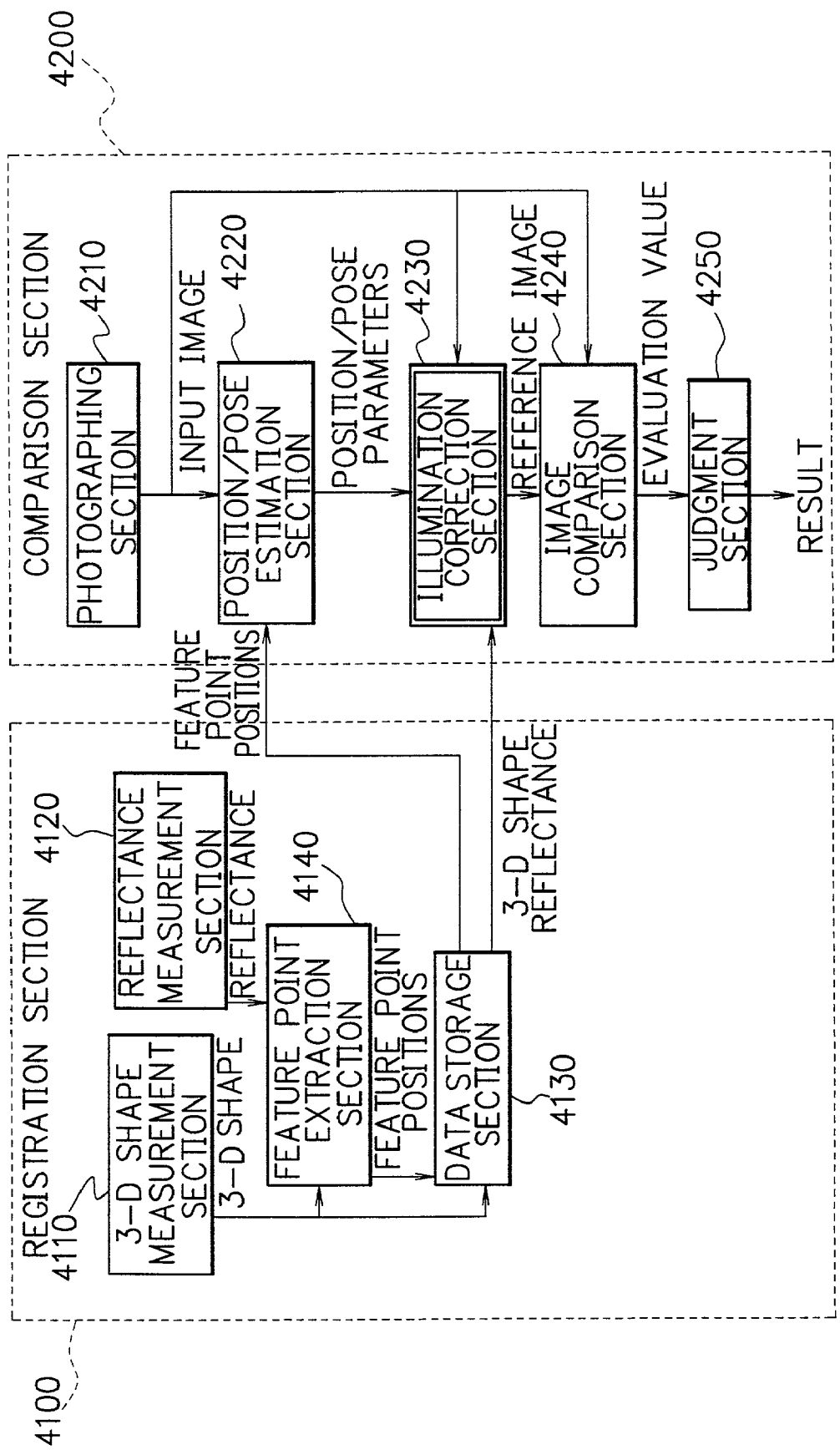
FIG. 16 is a schematic block diagram showing the composition and operation of an image comparison device in accordance with a fourth embodiment of the present invention.

FIG. 16 is a schematic block diagram showing the composition and operation of an image comparison device in accordance with a fourth embodiment of the present invention.

In the fourth embodiment, human faces are registered as the registered objects. Differently from the image comparison device of the first embodiment, a registration section 4100 of the image comparison device of FIG. 16 is further provided with a feature point extraction section 4140 which extracts feature points (where intensity etc. changes steeply) from each registered object and outputs the 3-D positions of the extracted feature points. A data storage section 4130 of the fourth embodiment also stores the feature point positions outputted by the feature point extraction section 4140. In a comparison section 4200 of the fourth embodiment, a position/pose estimation section 4220 reads out the feature point positions from the data storage section 4130 and automatically executes the position/pose estimation by use of the feature point positions.

The image comparison device of the fourth embodiment is designed based on the following principle: If the feature point positions of the target object in the input image can be determined and 3-D coordinates of the feature points can be obtained based on the registered data, the position/pose parameters (parameters concerning the position/pose of the target object in the input image and parameters concerning the photographing device) can be obtained automatically by use of the 2-D positions of the feature points in the input image and the 3-D coordinates of the feature points. As a method for automatically obtaining the parameters concerning the position/pose and the photographing device when 2-D positions of points in an image and 3-D coordinates of the points are known, the "camera calibration method" can be used.

In short, in the image comparison device of the fourth embodiment, the parameters concerning the position/pose and the photographing device are obtained not by comparing images, but by determining positions of feature points (points or areas where intensity etc. changes steeply) both in the input image and CG images and selecting a CG image whose feature point positions are the nearest to those of the input image.

It is also possible to determine the position/pose of the target object in the input image by use of the relationship between the feature point positions in the input image. In a document: Shinn-Ying Ho and Hui-Ling Huang "An analytic solution for the pose determination of human faces from a monocular image", Pattern Recognition Letters, Vol. 19, pp. 1045–1054 (1998), feature points such as the tails of eyes and the ends of lips are used when human faces are recognized and compared, and the position/pose of an object is determined by use of the relationship between the feature points (a line connecting two eye-feature points is parallel to a line connecting two mouth-feature points, etc.).

Figure 17:
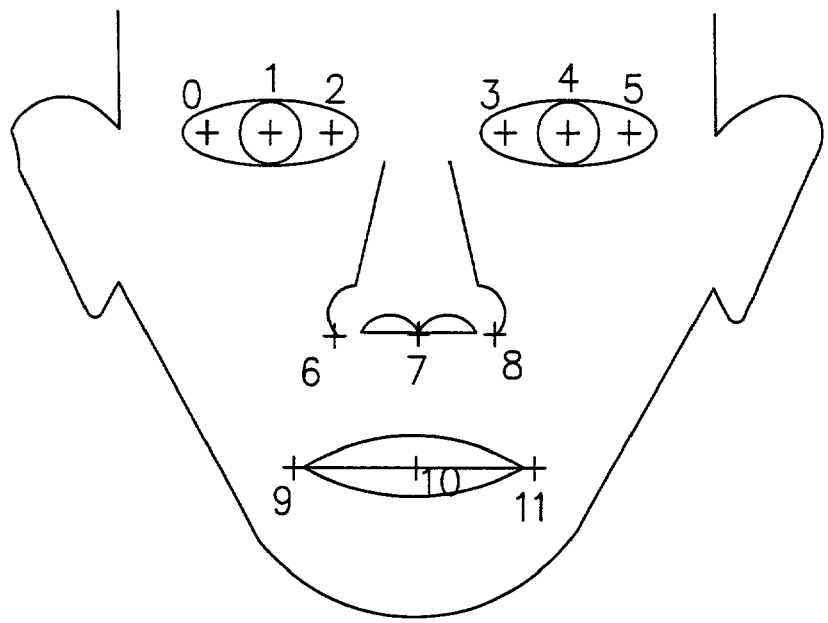
FIG. 17 is a schematic diagram showing twelve feature points which are employed in the fourth embodiment.

In the following, the composition and operation of the image comparison device of the fourth embodiment will be explained in detail referring to FIG. 16 through FIG. 18.

The image comparison device shown in FIG. 16 is composed of a registration section 4100 and a comparison section 4200 similarly to the image comparison device of the previous embodiments.

The registration section 4100 includes a 3-D shape measurement section 4110, a reflectance measurement section 4120, a feature point extraction section 4140 and a data storage section 4130. In the registration section 4100, the 3-D shape and reflectance of each registered object are measured and obtained as the registered data to be used for the object comparison, and 3-D coordinates of feature points (feature point positions) of the registered object are obtained by use of the measured 3-D shape and reflectance. The 3-D shape, the reflectance (or color/intensity information) and the feature point positions are registered and stored in the data storage section 4130.

The 3-D shape measurement section 4110, which is provided with a 3-D shape measurement device, measures the 3-D shape of each registered object. While the 3-D shape measurement device of Japanese Patent Application No. HEI11-123687 is employed in the fourth embodiment as an example, other devices can of course be used.

The reflectance measurement section 4120 measures the reflectance of the surface of the registered object corresponding to the 3-D shape. If the 3-D shape measurement device of Japanese Patent Application No. HEI11-123687 is employed, color information (intensity) on the surface of the object can be measured simultaneously with the 3-D shape. The color information (intensity) obtained by the device will hereafter be substituted for the reflectance data.

The feature point extraction section 4140 extracts feature points (points or areas where intensity etc. changes steeply) of the registered object, and stores the 3-D coordinates of the feature points (feature point positions) in the data storage section 4130. For example, when human faces are registered as the registered objects, parts where reflectance changes steeply (tails of eyes, lips, etc.), parts where the 3-D shape changes steeply (tip of nose etc.), etc. are detected and extracted by the feature point extraction section 4140 as the feature points. The feature point extraction process can be conducted automatically or by manual operation. For the automatic feature point extraction process, various methods including those disclosed in the aforementioned document No. 1 (Japanese Patent No. 2872776: "face image comparison device") and the aforementioned document No. 3 (Japanese Patent Application Laid-Open No. HEI6-168317: "personal identification device") can be employed. In this embodiment, twelve points (Θ~11) shown in FIG. 17 are used as the feature points. The definition of the feature points can of course be altered depending on what the target object is. In the following explanation, the feature point positions (3-D coordinates) will be expressed by use of vectors $Ai=(x_i, y_i, z_i)$ (i=0, 1, . . . , 11).

The data storage section 4130 stores the 3-D shapes, the reflectance (or color/intensity information) and the feature point positions of the registered objects as the registered data. The registered data stored in the data storage section 4130 are read out when the comparison step is conducted by the comparison section 4200.

The comparison section 4200 includes a photographing section 4210, a position/pose estimation section 4220, an illumination correction section 4230, an image comparison section 4240 and a judgment section 4250.

The photographing section 4210, which is provided with a camera, a video camera, etc., photographs the target object and thereby obtains the input image. The input image obtained by the photographing section 4210 is supplied to the position/pose estimation section 4220, the illumination correction section 4230 and the image comparison section 4240.

The position/pose estimation section 4220 estimates the position/pose parameters at the time when the target object was photographed by the photographing section 4210.

Figure 18:
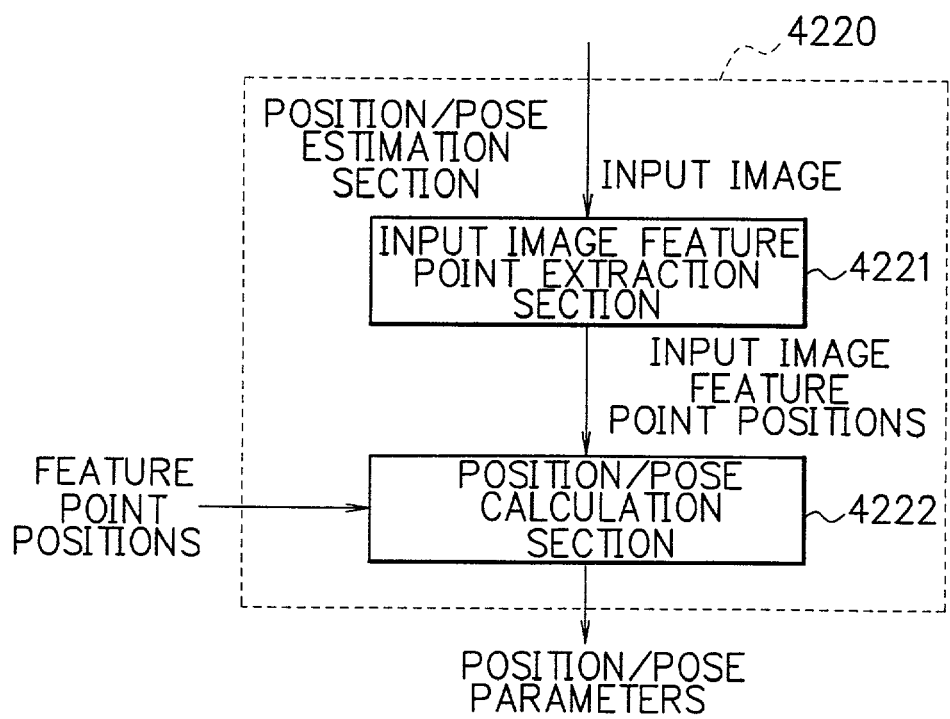
FIG. 18 is a schematic block diagram showing the detailed composition and process flow of a position/pose estimation section of the image comparison device of FIG. 16.

FIG. 18 is a schematic block diagram showing the detailed composition and process flow of the position/pose estimation section 4220. The position/pose estimation section 4220 shown in FIG. 18 includes an input image feature point extraction section 4221 and a position/pose calculation section 4222.

The input image feature point extraction section 4221 extracts feature points (corresponding to the feature points extracted by the feature point extraction section 4140 of the registration section 4100) from the input image and outputs 2-D position vectors $Bi=(u_i, v_i)$ (i=0, 1, . . . 11) of the extracted feature points in the input image to the position/ pose calculation section 4222 as input image feature point positions. The input image feature point extraction process can be conducted automatically or by manual operation of an operator seeing the input image on the screen. For the automatic input image feature point extraction process, the methods employed by the feature point extraction section 4140 (such as the methods of the document No. 3) can be used.

While human face comparison is taken as an example in this embodiment, the image comparison device of the fourth embodiment can be used for comparison of various objects. For the comparison of polyhedron-like objects, apexes of the objects can be used as the feature points. Edges are extracted from each object first and the apexes of the object are detected as intersection points of the edges. When some characteristic patterns exist on the surfaces of the objects, the positions of the patterns can be used as the feature point positions or the input image feature point positions.

The position/pose calculation section 4222 calculates the position/pose parameters (parameters concerning the position/pose of the target object in the input image and parameters concerning the photographing device) by use of the feature point positions read out from the data storage section 4130 and the input image feature point positions outputted by the input image feature point extraction section 4221, and outputs the calculated position/pose parameters to the illumination correction section 4230. For the calculation executed by the position/pose calculation section 4222, various methods, including a method disclosed in a document: Roger Y. Tsai "An Efficient and Accurate Camera Calibration Technique for 3D Machine Vision", Proc. CVPR '86, pp 364–374 (1986), can be employed.

The position/pose parameters employed in the fourth embodiment include, for example, the position (or translation distance) (Tx, Ty, Tz) of the target object, rotation angles (Rx, Ry, Rz) of the target object (around the x-axis, y-axis and z-axis) and the focal length "f" of the camera. The pinhole camera model is employed as the camera model. The relationship between the feature point position vector $Ai=(x_i, y_i, z_i)$ and the input image feature point position vector $Bi=(u_i, v_i)$ can be expressed by the following equation (9).

$$\begin{bmatrix} ui \\ vi \end{bmatrix} = \frac{f}{c}\begin{bmatrix} a \\ b \end{bmatrix} \quad (9)$$

where "a", "b" and "c" are defined as follows:

$$\begin{bmatrix} a \\ b \\ c \end{bmatrix} = R\begin{bmatrix} xi \\ yi \\ zi \end{bmatrix} + \begin{bmatrix} Tx \\ Ty \\ Tz \end{bmatrix} \quad (10)$$

where "R" is the following rotation matrix:

The position/pose calculation section 4222 obtains the position/pose parameters (Rx, Ry, Rz, Tx, Ty, Tz, f) by optimization calculation so that the sum of the differences between the 2-D positions obtained by the equation (9) and the input image feature point positions with respect to the 12 feature points will be the smallest. The optimization calculation can be executed in various ways. The position/pose parameters (Rx, Ry, Rz, Tx, Ty, Tz, f) obtained by the position/pose calculation section 4222 are supplied to the illumination correction section 4230. The definitions of the position/pose parameters and the camera model and the calculation method explained above are only examples, and thus the position/pose calculation process can be conducted according to various methods.

The illumination correction section 4230 generates a 2-D image (reference image) of the registered object in the same position/pose (as the target object in the input image) under an illumination condition that is the most similar to that of the input image, using the position/pose parameters obtained by the position/pose calculation section 4222 of the position/pose estimation section 4220.

The image comparison section 4240 calculates an evaluation value concerning the similarity between the input image and the reference image generated by the illumination correction section 4230. Various calculation methods can be employed for the evaluation. For example, the sum of squares of pixel intensity differences (image distance D) which has been shown in the equation (7) can be used as the evaluation value.

The judgment section 4250 executes judgment (whether or not the target image is the registered image, for example) by use of the evaluation value D calculated by the image comparison section 4240 and a threshold value. When only one object has been registered as the registered object, the judgment section 4250 compares the evaluation value D with a threshold value D' and thereby judges whether or not the target object is the same as or similar to the registered object. When two or more objects have been registered as the registered objects, the reference image generation by the illumination correction section 4230 and the evaluation value calculation by the image comparison section 4240 are conducted repeatedly for each registered object. In this case, the judgment section 4250 can judge which registered object is the most similar to the target object by finding a reference image that gives the smallest evaluation value D. It is also possible to let the judgment section 4250 search for one or more registered objects that are similar to the target object by finding registered objects giving evaluation values D<D'.

[Embodiment 5]

In the following, an image comparison device in accordance with a fifth embodiment of the present invention will be explained in detail. The image comparison device of the fifth embodiment is applied to cases where the registered objects are industry products etc. whose design drawings concerning the 3-D shapes have been saved as CAD data and whose surface painting specifications etc. have been designated and written in drawings.

$$R = \begin{bmatrix} \cos Ry\cos Rz & -\cos Rx\sin Rz + \sin Rx\sin Ry\cos Rz & \sin Rz\sin Rx + \cos Rx\sin Ry\cos Rz \\ \cos Ry\sin Rz & \cos Rx\cos Rz + \sin Rx\sin Ry\sin Rz & -\sin Rx\cos Rz + \cos Rx\sin Ry\sin Rz \\ -\sin Ry & \sin Rx\cos Ry & \cos Rx\cos Ry \end{bmatrix} \quad (11)$$

Differently from the first embodiment, a 3-D shape measurement section 110 of the fifth embodiment obtains the 3-D shape data of the registered objects from the CAD data of design drawings of the registered objects, and a reflectance measurement section 120 of the fifth embodiment obtains the reflectance data of the registered objects by reading drawings (in which surface painting specifications etc. have been designated and written). The image comparison device of the fifth embodiment can also be applied to cases where the 3-D shape measurement by use of an ordinary 3-D shape measurement device is difficult (for example, when the registered objects are houses, buildings, etc.) and the 3-D shape is obtained by actually making a survey or measurement.

The 3-D shape measurement section 110 reads the CAD data of the of the design drawings, converts the CAD data into a data format that can be handled by the comparison section 200, and stores the converted data in the data storage section 130 as the 3-D shape data.

The reflectance measurement section 120 reads data concerning the colors, surface finishing conditions, etc. of parts of the registered objects from the design drawings, converts the data into reflectance data, and stores the obtained reflectance data in the data storage section 130.

The data storage section 130 stores the 3-D shape data obtained by the 3-D shape measurement section 110 and the reflectance data obtained by the reflectance measurement section 120. The data (registered data) stored in the data storage section 130 are read out when the comparison step is conducted by the comparison section 200.

The comparison section 200 of the fifth embodiment conducts the comparison step in the same way as the first embodiment.

While the 3-D shape measurement section (110) and the reflectance measurement section (120) of the fifth embodiment have been applied to the first embodiment in the above explanation, applications of them to other embodiments of the present invention are also possible.

As set forth hereinabove, in the image comparison devices and the image comparison methods in accordance with the present invention, only the registration section (100, 2100, 3100, 4100) is required to obtain 3-D data (the 3-D shapes and the reflectance (or 2-D images under various illumination conditions)) of the registered objects, and the comparison section (200, 2200, 3200, 4200) obtains 2-D image of the target object as the input image by use of an ordinary photographing device such as a camera, video camera, etc. Therefore, the image comparison device can be constructed and used practically, without the need of a 3-D shape measurement device in the comparison step.

The registration section (100, 2100, 3100, 4100) stores the 3-D shapes of the registered objects, therefore, the comparison of objects can be conducted correctly compensating for and absorbing the three-dimensional changes of the position/pose of the target object in the input image.

The device and method of the present invention can be applied to cases where the surface reflectance properties of the objects are not perfect scattering or cases where cast shadows (due to light occlusion by other parts), specularity, etc. occur on the surfaces of the objects, and thus the variations of the illumination conditions in the input image can also be compensated for and absorbed sufficiently. Therefore, the image comparison devices and the image comparison methods of the present invention can be used for the comparison of a wider range and variety of objects in comparison to the aforementioned "illumination subspace method" and the "sampling method". The devices and methods of the present invention are especially effective for the comparison of automobiles (identification of the types/models of automobiles), human faces (personal identification), etc.

The illumination variation images can automatically be generated in the comparison step by use of the registered 3-D shape data and reflectance data. Therefore, there is no need of photographing and gathering a plurality of 2-D images of each registered object in the registration step, thereby the registration step can be conducted with less time and effort.

The lowest dimension number M that is required of the illumination variation image space (M-dimensional linear space $\Psi j$) can be determined by the judgment with regard to the cumulative contribution. Therefore, the amount of calculations necessary for the illumination correction process can be reduced without deteriorating the accuracy of the image comparison, thereby the illumination correction process can be conducted at high processing speed.

Incidentally, while the photographing sections (210, 2210, 3210, 4210) of the comparison sections (200, 2200, 3200, 4200) in the above embodiments obtained the input image of the target object by photographing the target object, it is also possible to let the photographing sections (210, 2210, 3210, 4210) obtain the input image by scanning a film, a photograph, printed matter, etc.

While the position/pose estimation sections (220, 2220, 3220, 4220) in the above embodiments estimated the position/pose of the target object in the input image or received inputs (of the user) concerning position/pose from outside, the position/pose estimation process can be omitted if the photographing of target objects by the photographing section (210, 2210, 3210, 4210) is done in a predetermined and fixed position/pose so that normalized input images can be obtained. The "normalized input image" means an input image in which the target object is photographed perfectly facing forward with his/her eyes perfectly on the level and the distance between the eyes are a predetermined distance, for example. In such cases, the position/pose estimation section (220, 2220, 3220, 4220) outputs a predetermined position/pose to the illumination correction section (230, 2230, 3230, 4230).

In the above case where the input image is obtained as a normalized input image, the composition of the registration section and the comparison section of the image comparison device can be changed properly. For example, the image generation section (232) for generating the illumination variation images and the illumination variation image space generation section (233) for generating the illumination variation image space can be provided not to the comparison section but to the registration section, since the position/pose estimation process executed in the comparison section becomes unnecessary.

While the present invention has been described with reference to the particular illustrative embodiments, it is not to be restricted by those embodiments but only by the appended claims. The present invention can also be implemented by use of a computer program stored in a record medium. It is to be appreciated that those skilled in the art can change or modify the embodiments without departing from the scope and spirit of the present invention.

What is claimed is:

1. An image comparison device comprising:
    a registration means for obtaining and registering 3-D data of all or part of one or more registered objects; and
    a comparison means for obtaining 2-D data of a target object and comparing the obtained 2-D data with the data registered in the registration means for conducting judgment concerning the similarity/sameness between the target object and each of the one or more registered objects, wherein the comparison means includes:

a photographing means for photographing the target object and thereby obtaining an input image;

a position/pose determination means for determining the position/pose of the target object in the input image obtained by the photographing means;

an illumination correction means for generating an image of each registered object in the same position/pose as the target object in the input image and under an illumination condition most similar to that of the input image as a reference image by use of the position/pose determined by the position/pose determination means and the data registered in the registration means;

an image comparison means for comparing each reference image generated by the illumination correction means with the input image obtained by the photographing means and thereby calculating an evaluation value concerning the similarity between the two images; and a judgment means for judging whether or not each of the registered objects registered in the registration means is the same as or similar to the target object photographed by the photographing means based on the evaluation value calculated by the image comparison means.

2. An image comparison device as claimed in claim 1, wherein the registration means includes:

a 3-D shape measurement means for measuring the 3-D shape of each registered object;

a reflectance measurement means for measuring the reflectance at each position on the surface of the 3-D shape of the registered object; and a data storage means for storing the 3-D shapes measured by the 3-D shape measurement means and the reflectance measured by the reflectance measurement means as the registered data.

3. An image comparison device as claimed in claim 1, wherein the registration means includes:

a 3-D shape measurement means for measuring the 3-D shapes of all or part of the one or more registered objects;

a color/intensity measurement means for photographing the registered object and thereby obtaining information concerning color or intensity of the registered object; and a data storage means for storing the 3-D shapes measured by the 3-D shape measurement means and the color/intensity information obtained by the color/intensity measurement means as the registered data.

4. An image comparison device as claimed in claim 1, wherein the registration means includes:

a 3-D shape measurement means for measuring the 3-D shapes of all or part of the one or more registered objects;

an average shape generation means for generating an average 3-D shape as the average of one or more of the 3-D shapes measured by the 3-D shape measurement means;

a reflectance measurement means for measuring the reflectance at each position on the surface of the 3-D shape of the registered object; and a data storage means for storing the 3-D shapes measured by the 3-D shape measurement means, the average 3-D shape generated by the average shape generation means and the reflectance measured by the reflectance measurement means as the registered data.

5. An image comparison device as claimed in claim 1, wherein the illumination correction means includes:

an image generation means for generating images of each registered object in the same position/pose as the target object in the input image and under various illumination conditions as illumination variation images by use of the position/pose estimated by the position/pose determination means and the data registered in the registration means; and an illumination condition estimation means for generating an image that is the most similar to the input image obtained by the photographing means by use of the illumination variation images generated by the image generation means and outputting the generated image to the image comparison means as the reference image.

6. An image comparison device as claimed in claim 5, wherein:

the illumination correction means further includes an illumination variation image space generation means for generating an illumination variation image space which is spanned by the illumination variation images generated by the image generation means, and the illumination condition estimation means generates the image that is the most similar to the input image from the illumination variation image space generated by the illumination variation image space generation means and outputs the generated image to the image comparison means as the reference image.

7. An image comparison device as claimed in claim 6, wherein:

the illumination variation image space generation means generates basis vectors of a space that almost accommodates image variation due to the illumination variation by conducting principal component analysis (PCA) to the illumination variation images generated by the image generation means, and the illumination condition estimation means obtains inner products between the input image obtained by the photographing means and each of the basis vectors generated by the illumination variation image space generation means, generates the image that is the most similar to the input image by use of the basis vectors and based on the inner products, and outputs the generated image to the image comparison means as the reference image.

8. An image comparison device as claimed in claim 5, wherein the illumination correction means further includes an illumination condition variation means for setting various illumination conditions and outputting the illumination conditions to the image generation means.

9. An image comparison device as claimed in claim 1, wherein:

the registration means includes:

a 3-D shape measurement means for measuring the 3-D shape of each registered object;

a texture image photographing means for photographing the registered object under various illumination conditions and thereby obtaining texture images of the registered object; and a data storage means for storing the 3-D shapes measured by the 3-D shape measurement means and the texture images obtained by the texture image photographing means as the registered data, and the illumination correction means includes:

an image generation means for generating images of each registered object in the same position/pose as the target object in the input image and under various illumination conditions as illumination variation images by use of the position/pose determined by the position/pose determination means and the 3-D shapes and the texture images of the registered object registered in the registration means; and an illumination condition estimation means for generating an image that is the most similar to the input image obtained by the photographing means by use of the illumination variation images generated by the image generation means and outputting the generated image to the image comparison means as the reference image.

10. An image comparison device as claimed in claim 9, wherein the illumination correction means further includes an illumination variation image space generation means for generating an illumination variation image space which is spanned by the illumination variation images generated by the image generation means, and the illumination condition estimation means generates the image that is the most similar to the input image from the illumination variation image space generated by the illumination variation image space generation means and outputs the generated image to the image comparison means as the reference image.

11. An image comparison device as claimed in claim 10, wherein:

the illumination variation image space generation means generates basis vectors of a space that almost accommodates image variation due to the illumination variation by conducting the principal component analysis (PCA) to the illumination variation images generated by the image generation means, and the illumination condition estimation means obtains inner products between the input image obtained by the photographing means and each of the basis vectors generated by the illumination variation image space generation means, generates the image that is the most similar to the input image by use of the basis vectors and based on the inner products, and outputs the generated image to the image comparison means as the reference image.

12. An image comparison device as claimed in claim 1, wherein the position/pose determination means outputs a predetermined position/pose to the illumination correction means.

13. An image comparison device as claimed in claim 1, wherein the position/pose determination means receives inputs concerning position/pose from outside, and outputs the received position/pose to the illumination correction means.

14. An image comparison device as claimed in claim 1, wherein the position/pose determination means estimates the position/pose of the target object in the input image obtained by the photographing means, and outputs the estimated position/pose to the illumination correction means.

15. An image comparison device as claimed in claim 14, wherein:

the registration means includes:

a 3-D shape measurement means for measuring the 3-D shape of each registered object;

a reflectance measurement means for measuring the reflectance at each position on the surface of the 3-D shape of the registered object;

a first feature point extraction means for extracting feature points of the registered object based on the 3-D shape measured by the 3-D shape measurement means and the reflectance measured by the reflectance measurement means and obtaining the positions of the extracted feature points; and a data storage means for storing the 3-D shapes measured by the 3-D shape measurement means, the reflectance measured by the reflectance measurement means and the feature point positions obtained by the first feature point extraction means as the registered data, and the position/pose determination means includes:

a second feature point extraction means for extracting feature points corresponding to those extracted by the first feature point extraction means from the input image obtained by the photographing means and obtaining the positions of the extracted feature points; and a position/pose calculation means for estimating the position/pose of the target object in the input image based on the 3-D shape and the feature point positions stored in the data storage means and the input image feature point positions obtained by the second feature point extraction means and outputting the estimated position/pose to the illumination correction means.

16. An image comparison device as claimed in claim 15, wherein the illumination correction means includes:

an image generation means for generating images of each registered object in the same position/pose as the target object in the input image and under various illumination conditions as illumination variation images by use of the position/pose estimated by the position/pose determination means and the 3-D shape and the reflectance stored in the data storage means; and an illumination condition estimation means for generating an image that is the most similar to the input image obtained by the photographing means by use of the illumination variation images generated by the image generation means and outputting the generated image to the image comparison means as the reference image.

17. An image comparison device as claimed in claim 16, wherein:

the illumination correction means further includes an illumination variation image space generation means for generating an illumination variation image space which is spanned by the illumination variation images generated by the image generation means, and the illumination condition estimation means generates the image that is the most similar to the input image from the illumination variation image space generated by the illumination variation image space generation means and outputs the generated image to the image comparison means as the reference image.

18. An image comparison device as claimed in claim 17, wherein:

the illumination variation image space generation means generates basis vectors of a space that almost accommodates image variation due to the illumination variation by conducting principal component analysis (PCA) to the illumination variation images generated by the image generation means, and the illumination condition estimation means obtains inner products between the input image obtained by the photographing means and each of the basis vectors generated by the illumination variation image space generation means, generates the image that is the most similar to the input image by use of the basis vectors and based on the inner products, and outputs the generated image to the image comparison means as the reference image.

19. An image comparison device as claimed in claim 18, wherein the illumination correction means further includes an illumination condition variation means for setting various illumination conditions and outputting the illumination conditions to the image generation means.

20. An image comparison device as claimed in claim 2, wherein the 3-D shape measurement means obtains the 3-D shapes by reading data or drawings.

21. An image comparison device as claimed in claim 3, wherein the 3-D shape measurement means obtains the 3-D shapes by reading data or drawings.

22. An image comparison device as claimed in claim 9, wherein the 3-D shape measurement means obtains the 3-D shapes by reading data or drawings.

23. An image comparison device as claimed in claim 2, wherein the reflectance measurement means obtains the reflectance by reading data or drawings.

24. An image comparison device as claimed in claim 1, wherein the photographing means obtains the input image by scanning a film, a photograph or printed matter.

25. An image comparison device as claimed in claim 1, wherein the judgment means judges which registered object matches the target object.

26. An image comparison device as claimed in claim 1, wherein the judgment means searches for one or more registered objects that are similar to the target object.

27. An image comparison device as claimed in claim 1, wherein the registered objects are automobiles.

28. An image comparison device comprising:
a registration means for obtaining and registering 3-D data of all or part of one or more registered objects; and
a comparison means for obtaining 2-D data of a target object and comparing the obtained 2-D data with the data registered in the registration means for conducting judgment concerning the similarity/sameness between the target object and each of the one or more registered objects, wherein:
the registration means includes:
a 3-D shape measurement means for measuring the 3-D shape of each registered object;
a reflectance measurement means for measuring the reflectance at each position on the surface of the 3-D shape of the registered object;
an image generation means for generating images of each registered object under various illumination conditions as illumination variation images;
an illumination variation image space generation means for generating an illumination variation image space which is spanned by the illumination variation images generated by the image generation means; and
a data storage means for storing the illumination variation image space generated by the illumination variation image space generation means as the registered data, and
the comparison means includes:
a photographing means for photographing the target object and thereby obtaining an input image;
an illumination condition estimation means for generating an image of each registered object that is the most similar to the input image as a reference image from the illumination variation image space stored in the data storage means;
an image comparison means for comparing each reference image generated by the illumination condition estimation means with the input image obtained by the photographing means and thereby calculating an evaluation value concerning the similarity between the two images; and
a judgment means for judging whether or not each of the registered objects registered in the registration means is the same as or similar to the target object photographed by the photographing means based on the evaluation value calculated by the image comparison means.

29. An image comparison device as claimed in claim 28, wherein:
the illumination variation image space generation means generates basis vectors of a space that almost accommodates image variation due to the illumination variation by conducting principal component analysis (PCA) to the illumination variation images generated by the image generation means, and
the data storage means stores the basis vectors generated by the illumination variation image space generation means as the registered data, and
the illumination condition estimation means obtains inner products between the input image obtained by the photographing means and each of the basis vectors stored in the data storage means, generates the image that is the most similar to the input image by use of the basis vectors and based on the inner products, and outputs the generated image to the image comparison means as the reference image.

30. An image comparison device as claimed in claim 28, wherein the registered objects are automobiles.

31. An image comparison method comprising the steps of:
a registration step in which 3-D data of all or part of one or more registered objects are obtained and registered; and
a comparison step in which 2-D data of a target object is obtained and the obtained 2-D data is compared with the data registered in the registration step for conducting judgment concerning the similarity/sameness between the target object and each of the one or more registered objects, wherein the comparison step includes:
a photographing step in which the target object is photographed and thereby an input image is obtained;
a position/pose determination step in which the position/pose of the target object in the input image obtained in the photographing step is determined;
an illumination correction step in which an image of each registered object in the same position/pose as the target object in the input image and under an illumination condition most similar to that of the input image is obtained as a reference image by use of the position/pose determined in the position/pose determination step and the data registered in the registration step;
an image comparison step in which each reference image generated in the illumination correction step is compared with the input image obtained in the photographing step and thereby an evaluation value concerning the similarity between the two images is calculated; and
a judgment step in which it is judged whether or not each of the registered objects registered in the registration step is the same as or similar to the target object photographed in the photographing step based on the evaluation value calculated in the image comparison step.

32. An image comparison method as claimed in claim 31, wherein the registration step includes:
a 3-D shape measurement step in which the 3-D shape of each registered object is measured;

a reflectance measurement step in which the reflectance at each position on the surface of the 3-D shape of the registered object is measured; and a data storage step in which the 3-D shapes measured in the 3-D shape measurement step and the reflectance measured in the reflectance measurement step are stored as the registered data.

33. An image comparison method as claimed in claim 31, wherein the registration step includes:
   a 3-D shape measurement step in which the 3-D shapes of all or part of the one or more registered objects are measured;
   a color/intensity measurement step in which the registered object is photographed and thereby information concerning color or intensity of the registered object is obtained; and
   a data storage step in which the 3-D shapes measured in the 3-D shape measurement step and the color/intensity information obtained in the color/intensity measurement step are stored as the registered data.

34. An image comparison method as claimed in claim 31, wherein the registration step includes:
   a 3-D shape measurement step in which the 3-D shapes of all or part of the one or more registered objects are measured;
   an average shape generation step in which an average 3-D shape is generated as the average of one or more of the 3-D shapes measured in the 3-D shape measurement step;
   a reflectance measurement step in which the reflectance at each position on the surface of the 3-D shape of the registered object is measured; and
   a data storage step in which the 3-D shapes measured in the 3-D shape measurement step, the average 3-D shape generated in the average shape generation step and the reflectance measured in the reflectance measurement step are stored as the registered data.

35. An image comparison method as claimed in claim 31, wherein the illumination correction step includes:
   an image generation step in which images of each registered object in the same position/pose as the target object in the input image and under various illumination conditions are generated as illumination variation images by use of the position/pose estimated in the position/pose determination step and the data registered in the registration step; and
   an illumination condition estimation step in which an image that is the most similar to the input image obtained in the photographing step is generated as the reference image by use of the illumination variation images generated in the image generation step.

36. An image comparison method as claimed in claim 35, wherein:
   the illumination correction step further includes an illumination variation image space generation step in which an illumination variation image space which is spanned by the illumination variation images generated in the image generation step is generated, and
   in the illumination condition estimation step, the image that is the most similar to the input image is generated as the reference image from the illumination variation image space generated in the illumination variation image space generation step.

37. An image comparison method as claimed in claim 36, wherein:
   in the illumination variation image space generation step, basis vectors of a space that almost accommodates image variation due to the illumination variation are generated by conducting principal component analysis (PCA) to the illumination variation images generated in the image generation step, and
   in the illumination condition estimation step, inner products are obtained between the input image obtained in the photographing step and each of the basis vectors generated in the illumination variation image space generation step, and the image that is the most similar to the input image is generated as the reference image by use of the basis vectors and based on the inner products.

38. An image comparison method as claimed in claim 35, wherein the illumination correction step further includes an illumination condition variation step in which various illumination conditions are set and generated to be used in the image generation step.

39. An image comparison method as claimed in claim 31, wherein:
   the registration step includes:
      a 3-D shape measurement step in which the 3-D shape of each registered object is measured;
      a texture image photographing step in which the registered object is photographed under various illumination conditions and thereby texture images of the registered object are obtained; and
      a data storage step in which the 3-D shapes measured in the 3-D shape measurement step and the texture images obtained in the texture image photographing step are stored as the registered data, and
   the illumination correction step includes:
      an image generation step in which images of each registered object in the same position/pose as the target object in the input image and under various illumination conditions are generated as illumination variation images by use of the position/pose determined in the position/pose determination step and the 3-D shapes and the texture images of the registered object registered in the registration step; and
      an illumination condition estimation step in which an image that is the most similar to the input image obtained in the photographing step is generated as the reference image by use of the illumination variation images generated in the image generation step.

40. An image comparison method as claimed in claim 39, wherein the illumination correction step further includes an illumination variation image space generation step in which an illumination variation image space which is spanned by the illumination variation images generated in the image generation step is generated, and
   in the illumination condition estimation step, the image that is the most similar to the input image is generated as the reference image from the illumination variation image space generated in the illumination variation image space generation step.

41. An image comparison method as claimed in claim 40, wherein:
   in the illumination variation image space generation step, basis vectors of a space that almost accommodates image variation due to the illumination variation are generated by conducting the principal component analysis (PCA) to the illumination variation images generated in the image generation step, and
   in the illumination condition estimation step, inner products are obtained between the input image obtained in the photographing step and each of the basis vectors generated in the illumination variation image space generation step, and the image that is the most similar to the input image is generated as the reference image by use of the basis vectors and based on the inner products.

42. An image comparison method as claimed in claim 31, wherein in the position/pose determination step, a predetermined position/pose is adopted as the position/pose of the target object in the input image to be used in the illumination correction step.

43. An image comparison method as claimed in claim 31, wherein in the position/pose determination step, a position/pose inputted from outside is adopted as the position/pose of the target object in the input image to be used in the illumination correction step.

44. An image comparison method as claimed in claim 31, wherein in the position/pose determination step, the position/pose of the target object in the input image obtained in the photographing step is estimated to be used in the illumination correction step.

45. An image comparison method as claimed in claim 44, wherein:
the registration step includes:
a 3-D shape measurement step in which the 3-D shape of each registered object is measured;
a reflectance measurement step in which the reflectance at each position on the surface of the 3-D shape of the registered object is measured;
a first feature point extraction step in which feature points of the registered object are extracted based on the 3-D shape measured in the 3-D shape measurement step and the reflectance measured in the reflectance measurement step and the positions of the extracted feature points are obtained; and
a data storage step in which the 3-D shapes measured in the 3-D shape measurement step, the reflectance measured in the reflectance measurement step and the feature point positions obtained in the first feature point extraction step are stored as the registered data, and
the position/pose determination step includes:
a second feature point extraction step in which feature points corresponding to those extracted in the first feature point extraction step are extracted from the input image obtained in the photographing step and the positions of the extracted feature points are obtained; and
a position/pose calculation step in which the position/pose of the target object in the input image is estimated based on the 3-D shape and the feature point positions stored in the data storage step and the input image feature point positions obtained in the second feature point extraction step.

46. An image comparison method as claimed in claim 45, wherein the illumination correction step includes:
an image generation step in which images of each registered object in the same position/pose as the target object in the input image and under various illumination conditions are generated as illumination variation images by use of the position/pose estimated in the position/pose determination step and the 3-D shape and the reflectance stored in the data storage step; and
an illumination condition estimation step in which an image that is the most similar to the input image obtained in the photographing step is generated as the reference image by use of the illumination variation images generated in the image generation step.

47. An image comparison method as claimed in claim 46, wherein:
the illumination correction step further includes an illumination variation image space generation step in which an illumination variation image space which is spanned by the illumination variation images generated in the image generation step is generated, and
in the illumination condition estimation step, the image that is the most similar to the input image is generated as the reference image from the illumination variation image space generated in the illumination variation image space generation step.

48. An image comparison method as claimed in claim 47, wherein:
in the illumination variation image space generation step, basis vectors of a space that almost accommodates image variation due to the illumination variation are generated by conducting principal component analysis (PCA) to the illumination variation images generated in the image generation step, and
in the illumination condition estimation step, inner products are obtained between the input image obtained in the photographing step and each of the basis vectors generated in the illumination variation image space generation step, and the image that is the most similar to the input image is generated as the reference image by use of the basis vectors and based on the inner products.

49. An image comparison method as claimed in claim 48, wherein the illumination correction step further includes an illumination condition variation step in which various illumination conditions are set and generated to be used in the image generation step.

50. An image comparison method as claimed in claim 32, wherein in the 3-D shape measurement step, the 3-D shapes are obtained by reading data or drawings.

51. An image comparison method as claimed in claim 33, wherein in the 3-D shape measurement step, the 3-D shapes are obtained by reading data or drawings.

52. An image comparison method as claimed in claim 39, wherein in the 3-D shape measurement step, the 3-D shapes are obtained by reading data or drawings.

53. An image comparison method as claimed in claim 32, wherein in the reflectance measurement step, the reflectance is obtained by reading data or drawings.

54. An image comparison method as claimed in claim 31, wherein in the photographing step, the input image is obtained by scanning a film, a photograph or printed matter.

55. An image comparison method as claimed in claim 31, wherein the judgment step is executed for judging which registered object matches the target object.

56. An image comparison method as claimed in claim 31, wherein the judgment step is executed for searching for one or more registered objects that are similar to the target object.

57. An image comparison method as claimed in claim 31, wherein the registered objects are automobiles.

58. An image comparison method comprising the steps of:
a registration step in which 3-D data of all or part of one or more registered objects are obtained and registered; and
a comparison step in which 2-D data of a target object is obtained and the obtained 2-D data is compared with the data registered in the registration step for conducting judgment concerning the similarity/sameness between the target object and each of the one or more registered objects, wherein:

the registration step includes:

a 3-D shape measurement step in which the 3-D shape of each registered object is measured;

a reflectance measurement step in which the reflectance at each position on the surface of the 3-D shape of the registered object is measured;

an image generation step in which images of each registered object under various illumination conditions are generated as illumination variation images;

an illumination variation image space generation step in which an illumination variation image space which is spanned by the illumination variation images generated in the image generation step is generated; and a data storage step in which the illumination variation image space generated in the illumination variation image space generation step is stored as the registered data, and the comparison step includes:

a photographing step in which the target object is photographed and thereby an input image is obtained;

an illumination condition estimation step in which an image of each registered object that is the most similar to the input image is generated as a reference image from the illumination variation image space stored in the data storage step;

an image comparison step in which each reference image generated in the illumination condition estimation step is compared with the input image obtained in the photographing step and thereby an evaluation value concerning the similarity between the two images is calculated; and a judgment step in which it is judged whether or not each of the registered objects registered in the registration step is the same as or similar to the target object photographed in the photographing step based on the evaluation value calculated in the image comparison step.

59. An image comparison method as claimed in claim 58, wherein:

in the illumination variation image space generation step, basis vectors of a space that almost accommodates image variation due to the illumination variation are generated by conducting principal component analysis (PCA) to the illumination variation images generated in the image generation step, and in the data storage step, the basis vectors generated in the illumination variation image space generation step are stored as the registered data, and in the illumination condition estimation step, inner products are obtained between the input image obtained in the photographing step and each of the basis vectors stored in the data storage step, and the image that is the most similar to the input image is generated as the reference image by use of the basis vectors and based on the inner products.

60. An image comparison method as claimed in claim 58, wherein in the photographing step, the input image is obtained by scanning a film, a photograph or printed matter.

61. An image comparison method as claimed in claim 58, wherein the judgment step is executed for judging which registered object matches the target object.

62. An image comparison method as claimed in claim 58, wherein the registered objects are automobiles.

63. A computer-readable record medium storing one or more computer programs for instructing one or more computers, devices, MPUs (Microprocessor Units), etc. to execute an image comparison process comprising the steps of:

a registration step in which 3-D data of all or part of one or more registered objects are obtained and registered; and a comparison step in which 2-D data of a target object is obtained and the obtained 2-D data is compared with the data registered in the registration step for conducting judgment concerning the similarity/sameness between the target object and each of the one or more registered objects, wherein the comparison step includes:

a photographing step in which the target object is photographed and thereby an input image is obtained;

a position/pose determination step in which the position/pose of the target object in the input image obtained in the photographing step is determined;

an illumination correction step in which an image of each registered object in the same position/pose as the target object in the input image and under an illumination condition most similar to that of the input image is obtained as a reference image by use of the position/pose determined in the position/pose determination step and the data registered in the registration step;

an image comparison step in which each reference image generated in the illumination correction step is compared with the input image obtained in the photographing step and thereby an evaluation value concerning the similarity between the two images is calculated; and a judgment step in which it is judged whether or not each of the registered objects registered in the registration step is the same as or similar to the target object photographed in the photographing step based on the evaluation value calculated in the image comparison step.

64. A machine-readable record medium as claimed in claim 63, wherein the registration step includes:

a 3-D shape measurement step in which the 3-D shape of each registered object is measured;

a reflectance measurement step in which the reflectance at each position on the surface of the 3-D shape of the registered object is measured; and a data storage step in which the 3-D shapes measured in the 3-D shape measurement step and the reflectance measured in the reflectance measurement step are stored as the registered data.

65. A machine-readable record medium as claimed in claim 63, wherein the registration step includes:

a 3-D shape measurement step in which the 3-D shapes of all or part of the one or more registered objects are measured;

a color/intensity measurement step in which the registered object is photographed and thereby information concerning color or intensity of the registered object is obtained; and a data storage step in which the 3-D shapes measured in the 3-D shape measurement step and the color/intensity information obtained in the color/intensity measurement step are stored as the registered data.

66. A machine-readable record medium as claimed in claim 63, wherein the registration step includes:

a 3-D shape measurement step in which the 3-D shapes of all or part of the one or more registered objects are measured;

an average shape generation step in which an average 3-D shape is generated as the average of one or more of the 3-D shapes measured in the 3-D shape measurement step;

a reflectance measurement step in which the reflectance at each position on the surface of the 3-D shape of the registered object is measured; and a data storage step in which the 3-D shapes measured in the 3-D shape measurement step, the average 3-D shape generated in the average shape generation step and the reflectance measured in the reflectance measurement step are stored as the registered data.

67. A machine-readable record medium as claimed in claim 63, wherein the illumination correction step includes:

an image generation step in which images of each registered object in the same position/pose as the target object in the input image and under various illumination conditions are generated as illumination variation images by use of the position/pose estimated in the position/pose determination step and the data registered in the registration step; and an illumination condition estimation step in which an image that is the most similar to the input image obtained in the photographing step is generated as the reference image by use of the illumination variation images generated in the image generation step.

68. A machine-readable record medium as claimed in claim 67, wherein:

the illumination correction step further includes an illumination variation image space generation step in which an illumination variation image space which is spanned by the illumination variation images generated in the image generation step is generated, and in the illumination condition estimation step, the image that is the most similar to the input image is generated as the reference image from the illumination variation image space generated in the illumination variation image space generation step.

69. A machine-readable record medium as claimed in claim 68, wherein:

in the illumination variation image space generation step, basis vectors of a space that almost accommodates image variation due to the illumination variation are generated by conducting principal component analysis (PCA) to the illumination variation images generated in the image generation step, and in the illumination condition estimation step, inner products are obtained between the input image obtained in the photographing step and each of the basis vectors generated in the illumination variation image space generation step, and the image that is the most similar to the input image is generated as the reference image by use of the basis vectors and based on the inner products.

70. A machine-readable record medium as claimed in claim 67, wherein the illumination correction step further includes an illumination condition variation step in which various illumination conditions are set and generated to be used in the image generation step.

71. A machine-readable record medium as claimed in claim 63, wherein:

the registration step includes:

a 3-D shape measurement step in which the 3-D shape of each registered object is measured;

a texture image photographing step in which the registered object is photographed under various illumination conditions and thereby texture images of the registered object are obtained; and a data storage step in which the 3-D shapes measured in the 3-D shape measurement step and the texture images obtained in the texture image photographing step are stored as the registered data, and the illumination correction step includes:

an image generation step in which images of each registered object in the same position/pose as the target object in the input image and under various illumination conditions are generated as illumination variation images by use of the position/pose determined in the position/pose determination step and the 3-D shapes and the texture images of the registered object registered in the registration step; and an illumination condition estimation step in which an image that is the most similar to the input image obtained in the photographing step is generated as the reference image by use of the illumination variation images generated in the image generation step.

72. A machine-readable record medium as claimed in claim 71, wherein the illumination correction step further includes an illumination variation image space generation step in which an illumination variation image space which is spanned by the illumination variation images generated in the image generation step is generated, and in the illumination condition estimation step, the image that is the most similar to the input image is generated as the reference image from the illumination variation image space generated in the illumination variation image space generation step.

73. A machine-readable record medium as claimed in claim 72, wherein:

in the illumination variation image space generation step, basis vectors of a space that almost accommodates image variation due to the illumination variation are generated by conducting the principal component analysis (PCA) to the illumination variation images generated in the image generation step, and in the illumination condition estimation step, inner products are obtained between the input image obtained in the photographing step and each of the basis vectors generated in the illumination variation image space generation step, and the image that is the most similar to the input image is generated as the reference image by use of the basis vectors and based on the inner products.

74. A machine-readable record medium as claimed in claim 63, wherein in the position/pose determination step, a predetermined position/pose is adopted as the position/pose of the target object in the input image to be used in the illumination correction step.

75. A machine-readable record medium as claimed in claim 63, wherein in the position/pose determination step, a position/pose inputted from outside is adopted as the position/pose of the target object in the input image to be used in the illumination correction step.

76. A machine-readable record medium as claimed in claim 63, wherein in the position/pose determination step, the position/pose of the target object in the input image obtained in the photographing step is estimated to be used in the illumination correction step.

77. A machine-readable record medium as claimed in claim 76, wherein:

the registration step includes:
a 3-D shape measurement step in which the 3-D shape of each registered object is measured;
a reflectance measurement step in which the reflectance at each position on the surface of the 3-D shape of the registered object is measured;
a first feature point extraction step in which feature points of the registered object are extracted based on the 3-D shape measured in the 3-D shape measurement step and the reflectance measured in the reflectance measurement step and the positions of the extracted feature points are obtained; and
a data storage step in which the 3-D shapes measured in the 3-D shape measurement step, the reflectance measured in the reflectance measurement step and the feature point positions obtained in the first feature point extraction step are stored as the registered data, and
the position/pose determination step includes:
a second feature point extraction step in which feature points corresponding to those extracted in the first feature point extraction step are extracted from the input image obtained in the photographing step and the positions of the extracted feature points are obtained; and
a position/pose calculation step in which the position/pose of the target object in the input image is estimated based on the 3-D shape and the feature point positions stored in the data storage step and the input image feature point positions obtained in the second feature point extraction step.

78. A machine-readable record medium as claimed in claim 77, wherein the illumination correction step includes:
an image generation step in which images of each registered object in the same position/pose as the target object in the input image and under various illumination conditions are generated as illumination variation images by use of the position/pose estimated in the position/pose determination step and the 3-D shape and the reflectance stored in the data storage step; and
an illumination condition estimation step in which an image that is the most similar to the input image obtained in the photographing step is generated as the reference image by use of the illumination variation images generated in the image generation step.

79. A machine-readable record medium as claimed in claim 78, wherein:
the illumination correction step further includes an illumination variation image space generation step in which an illumination variation image space which is spanned by the illumination variation images generated in the image generation step is generated, and
in the illumination condition estimation step, the image that is the most similar to the input image is generated as the reference image from the illumination variation image space generated in the illumination variation image space generation step.

80. A machine-readable record medium as claimed in claim 79, wherein:
in the illumination variation image space generation step, basis vectors of a space that almost accommodates image variation due to the illumination variation are generated by conducting principal component analysis (PCA) to the illumination variation images generated in the image generation step, and in the illumination condition estimation step, inner products are obtained between the input image obtained in the photographing step and each of the basis vectors generated in the illumination variation image space generation step, and the image that is the most similar to the input image is generated as the reference image by use of the basis vectors and based on the inner products.

81. A machine-readable record medium as claimed in claim 80, wherein the illumination correction step further includes an illumination condition variation step in which various illumination conditions are set and generated to be used in the image generation step.

82. A machine-readable record medium as claimed in claim 64, wherein in the 3-D shape measurement step, the 3-D shapes are obtained by reading data or drawings.

83. A machine-readable record medium as claimed in claim 65, wherein in the 3-D shape measurement step, the 3-D shapes are obtained by reading data or drawings.

84. A machine-readable record medium as claimed in claim 71, wherein in the 3-D shape measurement step, the 3-D shapes are obtained by reading data or drawings.

85. A machine-readable record medium as claimed in claim 64, wherein in the reflectance measurement step, the reflectance is obtained by reading data or drawings.

86. A machine-readable record medium as claimed in claim 64, wherein in the photographing step, the input image is obtained by scanning a film, a photograph or printed matter.

87. A machine-readable record medium as claimed in claim 64, wherein the judgment step is executed for judging which registered object matches the target object.

88. A machine-readable record medium as claimed in claim 63, wherein the judgment step is executed for searching for one or more registered objects that are similar to the target object.

89. A machine-readable record medium as claimed in claim 63, wherein the registered objects are automobiles.

90. A machine-readable record medium as claimed in claim 63, wherein the registered objects are human faces.

91. A computer-readable record medium storing one or more computer programs for instructing one or more computers, devices, MPUs (Microprocessor Units), etc. to execute an image comparison process comprising the steps of:
a registration step in which 3-D data of all or part of one or more registered objects are obtained and registered; and
a comparison step in which 2-D data of a target object is obtained and the obtained 2-D data is compared with the data registered in the registration step for conducting judgment concerning the similarity/sameness between the target object and each of the one or more registered objects, wherein:
the registration step includes:
a 3-D shape measurement step in which the 3-D shape of each registered object is measured;
a reflectance measurement step in which the reflectance at each position on the surface of the 3-D shape of the registered object is measured;
an image generation step in which images of each registered object under various illumination conditions are generated as illumination variation images;
an illumination variation image space generation step in which an illumination variation image space which is spanned by the illumination variation images generated in the image generation step is generated; and a data storage step in which the illumination variation image space generated in the illumination variation image space generation step is stored as the registered data, and the comparison step includes:

a photographing step in which the target object is photographed and thereby an input image is obtained;

an illumination condition estimation step in which an image of each registered object that is the most similar to the input image is generated as a reference image from the illumination variation image space stored in the data storage step;

an image comparison step in which each reference image generated in the illumination condition estimation step is compared with the input image obtained in the photographing step and thereby an evaluation value concerning the similarity between the two images is calculated; and a judgment step in which it is judged whether or not each of the registered objects registered in the registration step is the same as or similar to the target object photographed in the photographing step based on the evaluation value calculated in the image comparison step.

92. A machine-readable record medium as claimed in claim 91, wherein:

in the illumination variation image space generation step, basis vectors of a space that almost accommodates image variation due to the illumination variation are generated by conducting principal component analysis (PCA) to the illumination variation images generated in the image generation step, and in the data storage step, the basis vectors generated in the illumination variation image space generation step are stored as the registered data, and in the illumination condition estimation step, inner products are obtained between the input image obtained in the photographing step and each of the basis vectors stored in the data storage step, and the image that is the most similar to the input image is generated as the reference image by use of the basis vectors and based on the inner products.

93. A machine-readable record medium as claimed in claim 91, wherein the registered objects are automobiles.

94. A machine-readable record medium as claimed in claim 91, wherein the registered objects are human faces.

95. An image comparison method comprising:

determining a pose of an object based on a 2-D image that is obtained by photographing the object;

generating an image of the object in that pose, making use of 3-D shape data, under an illumination condition similar to one under which the object was photographed; and examining similarities between the object and the 3-D shape data by comparing the 2-D image of the object with the generated image.

96. An image comparison device comprising:

a photographing means which obtains a 2-D image of an object;

a determination means which determines a pose of the object based on the 2-D image;

a generation means which generates an image of the object in the pose under an illumination condition similar to one under which the object was obtained by using 3-D shape data; and an examination means which examines similarities between the object and the 3-D shape data by comparing the 2-D image and the generated image.

97. A machine-readable record medium which stores a program for performing an image comparison method, the method comprising:

determining a pose of an object based on a 2-D image that is obtained by photographing the object;

generating an image of the object in that pose, making use of 3-D shape data, under an illumination condition similar to one under which the object was photographed; and examining similarities between the object and the 3-D shape data by comparing the 2-D image of the object with the generated image.

* * * * *

UNITED STATES PATENT AND TRADEMARK OFFICE
CERTIFICATE OF CORRECTION

PATENT NO. : 7,227,973 B2  Page 1 of 1
APPLICATION NO. : 09/823763
DATED : June 5, 2007
INVENTOR(S) : Rui Ishiyama It is certified that error appears in the above-identified patent and that said Letters Patent is hereby corrected as shown below:

Col. 21, line 32, delete "pi" and insert -- σi --

Claim 97, col. 52, line 28, delete "A machine-readable record medium" and insert -- A computer readable medium --

Signed and Sealed this

Twenty-second Day of December, 2009

David J. Kappos
*Director of the United States Patent and Trademark Office*